US012747355B2

(12) United States Patent
Hsieh

(10) Patent No.: US 12,747,355 B2
(45) Date of Patent: Sep. 29, 2026

(54) RESIN COMPOSITION AND ARTICLE MADE THEREFROM

(71) Applicant: Elite Material Co., Ltd., Taoyuan (TW)

(72) Inventor: Chen-Yu Hsieh, Taoyuan City (TW)

(73) Assignee: Elite Material Co., Ltd., Taoyuan City (TW)

( * ) Notice: Subject to any disclaimer, the term of this patent is extended or adjusted under 35 U.S.C. 154(b) by 507 days.

(21) Appl. No.: 18/368,712

(22) Filed: Sep. 15, 2023

(65) Prior Publication Data

US 2025/0059372 A1 Feb. 20, 2025

(30) Foreign Application Priority Data

Aug. 14, 2023 (TW) ................................ 112130423

(51) Int. Cl.

| | |
|---|---|
| ***C08L 71/00*** | (2006.01) |
| ***C08G 65/48*** | (2006.01) |
| ***C08G 73/10*** | (2006.01) |
| ***C08G 73/12*** | (2006.01) |
| ***C08G 79/04*** | (2006.01) |
| ***C08J 5/24*** | (2006.01) |
| ***C08L 71/12*** | (2006.01) |
| ***C08L 85/02*** | (2006.01) |

(52) U.S. Cl.

CPC ............ *C08L 85/02* (2013.01); *C08G 65/485* (2013.01); *C08G 73/10* (2013.01); *C08G 73/12* (2013.01); *C08G 73/124* (2013.01); *C08G 79/04* (2013.01); *C08J 5/24* (2013.01); *C08L 71/12* (2013.01); *C08L 2203/16* (2013.01); *C08L 2203/20* (2013.01); *C08L 2205/03* (2013.01)

(58) Field of Classification Search

CPC ......... C08L 71/12; C08L 85/02; C08G 73/12; C08G 65/485; C08G 73/124; C08G 79/04

See application file for complete search history.

(56) References Cited

U.S. PATENT DOCUMENTS

| | | | | |
|---|---|---|---|---|
| 2013/0075138 | A1* | 3/2013 | Yu | C08K 3/26 174/257 |
| 2016/0021740 | A1* | 1/2016 | Li | C08K 5/5397 428/458 |
| 2020/0399471 | A1* | 12/2020 | Hsieh | C08K 5/51 |
| 2021/0130610 | A1* | 5/2021 | Hsieh | C08L 25/10 |
| 2021/0371656 | A1* | 12/2021 | Yu | C08G 73/0233 |
| 2023/0062178 | A1* | 3/2023 | Hsieh | B32B 5/02 |
| 2023/0235172 | A1* | 7/2023 | Wang | C08G 65/485 523/222 |
| 2023/0383121 | A1* | 11/2023 | Hsu | C08L 53/02 |

FOREIGN PATENT DOCUMENTS

CN 114957547 A * 8/2022 ........ C08F 220/1802

OTHER PUBLICATIONS

CN-114957547-A_2022-08-30_English Translation.*

* cited by examiner

*Primary Examiner* — Michael L Leonard

(74) *Attorney, Agent, or Firm* — MUNCY, GEISSLER, OLDS & LOWE, P.C.

(57) ABSTRACT

A resin composition includes a vinyl group-containing resin and a phosphorus-containing compound of Formula (1) or a prepolymer thereof, wherein: relative to 100 parts by weight of the vinyl group-containing resin, the phosphorus-containing compound of Formula (1) is 35 to 60 parts by weight; or relative to 100 parts by weight of the vinyl group-containing resin, the prepolymer of the phosphorus-containing compound of Formula (1) is 50 to 90 parts by weight. The resin composition may be used to make various articles, including a resin film, a prepreg, a laminate or a printed circuit board, and one or more properties can be improved.

Formula (1)

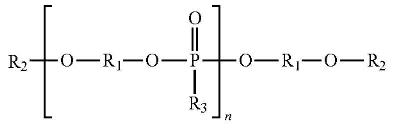

15 Claims, No Drawings

RESIN COMPOSITION AND ARTICLE MADE THEREFROM

CROSS-REFERENCE TO RELATED APPLICATION

This application claims the priority benefits of Taiwan Patent Application No. 112130423, filed on Aug. 14, 2023. The entirety of the above-mentioned patent application is hereby incorporated by reference herein and made a part of this specification.

BACKGROUND

1. Field of the Disclosure

The present disclosure relates to a resin composition and more particularly to a resin composition useful for preparing a prepreg, a resin film, a laminate or a printed circuit board.

2. Description of Related Art

In recent years, due to the development of electronic signal transmission toward 5G and the trend of miniaturization and high performance of electronic equipment, communication devices and personal computers, circuit boards for these applications were also developed toward multilayer configuration, high density trace interconnection, and high speed signal transmission, thereby presenting higher challenges to the overall performance of circuit laminates such as copper-clad laminates.

Accordingly, there is a need to provide a novel material meeting the property requirements of circuit boards used nowadays.

SUMMARY

To overcome the problems of prior arts, particularly one or more above-mentioned property demands facing conventional materials, it is a primary object of the present disclosure to provide a resin composition and an article made from the resin composition, which may achieve at least one desirable property improvement including PCT water absorption ratio, dielectric constant, dissipation factor, elongation, copper foil peeling strength and glass transition temperature.

To achieve the above-mentioned objects, the present disclosure provides a resin composition, comprising:

a vinyl group-containing resin; and a phosphorus-containing compound of Formula (1) or a prepolymer thereof;

wherein:

relative to 100 parts by weight of the vinyl group-containing resin, the phosphorus-containing compound of Formula (1) is 35 to 60 parts by weight; or relative to 100 parts by weight of the vinyl group-containing resin, the prepolymer of the phosphorus-containing compound of Formula (1) is 50 to 90 parts by weight;

Formula (1)

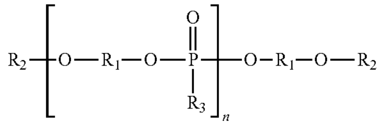

wherein $R_1$ each independently represent any divalent functional group of Formula (a) to Formula (d):

Formula (a)

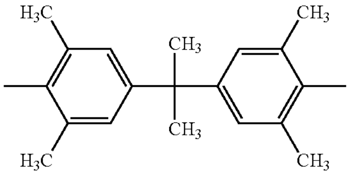

Formula (b)

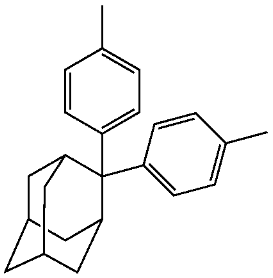

Formula (c)

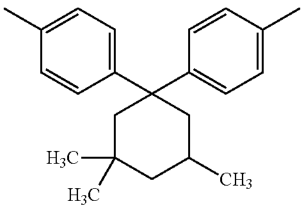

-continued

Formula (d)

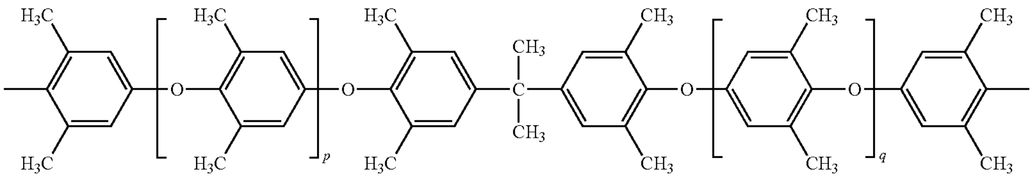

wherein p and q are each independently a positive integer, and p+q is between 2 and 11; $R_2$ each independently represent any monovalent functional group of Formula (e) to Formula (f):

Formula (e)

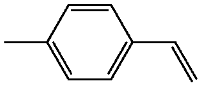

Formula (f)

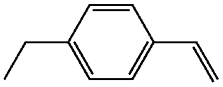

$R_3$ represents a phenyl group; and n represents a repeating number of unit in the brackets by which the phosphorus-containing compound of Formula (1) has a weight average molecular weight of between 500 and 10,000.

For example, in one embodiment, the vinyl group-containing resin comprises a vinyl group-containing polyphenylene ether resin, a maleimide resin, a compound of Formula (2), a vinyl group-containing polyolefin resin, triallyl isocyanurate or a combination thereof, Formula (2)

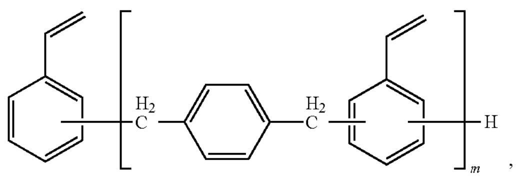

wherein m is an integer of 1 to 20.

For example, in one embodiment, the prepolymer of the phosphorus-containing compound of Formula (1) is prepared from a mixture subjected to a prepolymerization reaction, and the mixture comprises the phosphorus-containing compound of Formula (1) and a vinyl group-containing polyphenylene ether resin in a molar ratio of between 1:2 and 2:1.

For example, in one embodiment, the mixture is subjected to the prepolymerization reaction at 60° C. to 95° C. for 4 to 6 hours to prepare the prepolymer of the phosphorus-containing compound of Formula (1).

For example, in one embodiment, the prepolymerization reaction has a conversion rate of between 10% and 90%.

For example, in one embodiment, the resin composition comprises 100 parts by weight of the vinyl group-containing resin and 35 to 60 parts by weight of the phosphorus-containing compound of Formula (1).

For example, in one embodiment, the resin composition comprises 100 parts by weight of the vinyl group-containing resin and 50 to 90 parts by weight of the prepolymer of the phosphorus-containing compound of Formula (1).

For example, in one embodiment, the resin composition may optionally further comprise a phosphorus-containing maleimide resin.

For example, in one embodiment, the resin composition comprises 100 parts by weight of the vinyl group-containing resin, 35 to 60 parts by weight of the phosphorus-containing compound of Formula (1) and 5 to 60 parts by weight of the phosphorus-containing maleimide resin.

For example, in one embodiment, the resin composition comprises 100 parts by weight of the vinyl group-containing resin, 50 to 90 parts by weight of the prepolymer of the phosphorus-containing compound of Formula (1) and 5 to 45 parts by weight of the phosphorus-containing maleimide resin.

For example, in one embodiment, the resin composition further comprises inorganic filler, curing accelerator, polymerization inhibitor, solvent, silane coupling agent, surfactant, coloring agent, toughening agent or a combination thereof.

Moreover, the present disclosure also provides an article made from the resin composition described above, which comprises a prepreg, a resin film, a laminate or a printed circuit board.

For example, in one embodiment, articles made from the resin composition disclosed herein have one, more or all of the following properties:

a water absorption ratio as measured by reference to IPC-TM-650 2.6.16.1 of less than or equal to 0.310%;

a dielectric constant as measured by reference to JIS C2565 at 10 GHz of less than or equal to 3.27;

a dissipation factor as measured by reference to JIS C2565 at 10 GHz of less than or equal to 0.00287;

an elongation as measured by reference to ASTM D412 of greater than or equal to 6.95%;

a copper foil peeling strength as measured by reference to IPC-TM-650 2.4.8 of greater than or equal to 3.07 lb/in; and a glass transition temperature as measured by reference to IPC-TM-650 2.4.24.4 of greater than or equal to 182° C.

DESCRIPTION OF THE EMBODIMENTS

To enable those skilled in the art to further appreciate the features and effects of the present disclosure, words and terms contained in the specification and appended claims are described and defined. Unless otherwise defined, all technical and scientific terms used herein have the same meaning as commonly understood by those of ordinary skill in the art to which this disclosure pertains. In the case of conflict, the present document and definitions contained herein will control.

While some theories or mechanisms may be proposed herein, the present disclosure is not bound by any theories or mechanisms described regardless of whether they are right or wrong, as long as the embodiments can be implemented according to the present disclosure.

As used herein, "a," "an" or any similar expression is employed to describe components and features of the present disclosure. This is done merely for convenience and to give a general sense of the scope of the present disclosure. Accordingly, this description should be read to include one or at least one and the singular also includes the plural unless it is obvious to mean otherwise.

As used herein, "or a combination thereof" means "or any combination thereof", and "any" means "any one", vice versa.

As used herein, the term "comprises," "comprising," "includes," "including," "encompass," "encompassing," "has," "having" or any other variant thereof is construed as an open-ended transitional phrase intended to cover a non-exclusive inclusion. For example, a composition or article of manufacture that comprises a list of elements is not necessarily limited to only those elements but may include other elements not expressly listed but inherent to such composition or article of manufacture. Further, unless expressly stated to the contrary, the term "or" refers to an inclusive or and not to an exclusive or. For example, a condition "A or B" is satisfied by any one of the following: A is true (or present) and B is false (or not present), A is false (or not present) and B is true (or present), and both A and B are true (or present). In addition, whenever open-ended transitional phrases are used, such as "comprises," "comprising," "includes," "including," "encompass," "encompassing," "has," "having" or any other variant thereof, it is understood that transitional phrases such as "consisting essentially of" and "consisting of" are also disclosed and included.

As used herein, the term "and" or any other variant thereof is used to connect parallel sentence components, and there is no distinction between the front and rear components. The meaning of the parallel sentence components does not change in the grammatical sense after the position is exchanged.

In this disclosure, features or conditions presented as a numerical range or a percentage range are merely for convenience and brevity. Therefore, a numerical range or a percentage range should be interpreted as encompassing and specifically disclosing all possible subranges and individual numerals or values therein, particularly all integers therein. For example, a range of "1 to 8" should be understood as explicitly disclosing all subranges such as 1 to 7, 2 to 8, 2 to 6, 3 to 6, 4 to 8, 3 to 8 and so on, particularly all subranges defined by integers, as well as disclosing all individual values such as 1, 2, 3, 4, 5, 6, 7 and 8. Similarly, a range of "between 1 and 8" should be understood as explicitly disclosing all ranges such as 1 to 8, 1 to 7, 2 to 8, 2 to 6, 3 to 6, 4 to 8, 3 to 8 and so on and encompassing the end points of the ranges. Unless otherwise defined, the aforesaid interpretation rule should be applied throughout the present disclosure regardless broadness of the scope.

Whenever amount, concentration or other numeral or parameter is expressed as a range, a preferred range or a series of upper and lower limits, it is understood that all ranges defined by any pair of the upper limit or preferred value and the lower limit or preferred value are specifically disclosed, regardless whether these ranges are explicitly described or not. In addition, unless otherwise defined, whenever a range is mentioned, the range should be interpreted as inclusive of the endpoints and every integers and fractions in the range.

Given the intended purposes and advantages of this disclosure are achieved, numerals or figures have the precision of their significant digits. For example, 40.0 should be understood as covering a range of 39.50 to 40.49.

As used herein, a Markush group or a list of items is used to describe examples or embodiments of the present disclosure. A skilled artisan will appreciate that all subgroups of members or items and individual members or items of the Markush group or list can also be used to describe the present disclosure. For example, when X is described as being "selected from a group consisting of $X_1$, $X_2$ and $X_3$," it is intended to disclose the situations of X is $X_1$ and X is $X_1$ and/or $X_2$ and/or $X_3$. In addition, when a Markush group or a list of items is used to describe examples or embodiments of the present disclosure, a skilled artisan will understand that any subgroup or any combination of the members or items in the Markush group or list may also be used to describe the present disclosure. Therefore, for example, when X is described as being "selected from a group consisting of $X_1$, $X_2$ and $X_3$" and Y is described as being "selected from a group consisting of $Y_1$, $Y_2$ and $Y_3$," the disclosure shall be interpreted as any combination of X is $X_1$ or $X_2$ or $X_3$ and Y is $Y_1$ or $Y_2$ or $Y_3$.

Unless otherwise specified, according to the present disclosure, a compound refers to a chemical substance formed by two or more elements bonded with chemical bonds and may comprise a small molecule compound and a polymer compound, but not limited thereto. Any compound disclosed herein is interpreted to not only include a single chemical substance but also include a class of chemical substances having the same kind of components or having the same property. In addition, as used herein, a mixture refers to a combination of two or more compounds.

Unless otherwise specified, the term "resin" of the present disclosure is a widely used common name of a synthetic polymer and is construed as comprising monomer and its combination, polymer and its combination or a combination of monomer and its polymer, but not limited thereto.

Unless otherwise specified, according to the present disclosure, a modification comprises a product derived from a resin with its reactive functional group modified, a product derived from a prepolymerization reaction of a resin and other resins, a product derived from a crosslinking reaction of a resin and other resins, a product derived from homopolymerizing a resin, a product derived from copolymerizing a resin and other resins, etc.

As used herein, a prepolymer refers to a product, derived from a compound or a mixture (monomer) that is subjected to prepolymerization (partial polymerization), contains unreacted reactive functional groups or has the potential to undergo further polymerization. For example, the progress of the prepolymerization reaction may be confirmed and controlled as needed by determining the molecular weight or the level of viscosity. Prepolymerization reaction disclosed herein may be initiated by the use of solvent and heating or by a thermal melting reaction, but not limited thereto. For example, prepolymerization by the use of solvent and heating refers to dissolving the raw material in a solvent, optionally adding a catalyst or a polymerization inhibitor, followed by heating after all components are melted in the solvent, so as to initiate the prepolymerization reaction. Prepolymerization by a thermal melting reaction refers to heating to melt the raw material and at the same time initiate the prepolymerization reaction. The product after prepolymerization (i.e., the prepolymer) has a molecular weight of greater than that of the compound monomer or mixture monomer prior to prepolymerization and may be analyzed by a gel permeation chromatograph (GPC). In the graph of retention time (X-axis) and molecular weight (Y-axis), the distribution peak of molecular weight of the prepolymer is located closer to the Y-axis (shorter retention time), and the distribution peak of molecular weight of the monomer is located behind (longer retention time). In addition, the prepolymer obtained has a wider distribution of molecular weight that contains multiple adjacent peaks, while the monomer has a narrower distribution of molecular weight that contains only one peak.

To those of ordinary skill in the art to which this disclosure pertains, a resin composition containing an additive and two compounds (e.g., A and B), a total of three components, is different form a resin composition containing the additive and a prepolymer formed by the two compounds (e.g., A and B), a total of two components, as they are completely different from each other in the aspects of preparation method, physical or chemical properties of the resin composition and properties of an article or product made therefrom. For example, the former involves mixing A, B and the additive to form the resin composition; in contrast, the latter involves first subjecting a mixture comprising A and B to a prepolymerization reaction at proper conditions to form a prepolymer and then mixing the prepolymer with the additive to form the resin composition. For example, to those of ordinary skill in the art to which this disclosure pertains, the two resin compositions have completely different compositions; in addition, because the prepolymer formed by A and B functions completely different from A and B individually or collectively in the resin composition, the two resin compositions should be construed as completely different chemical substances and have completely different chemical statuses. For example, to those of ordinary skill in the art to which this disclosure pertains, because the two resin compositions are completely different chemical substances, articles made therefrom will not have the same properties.

As used herein, "vinyl group-containing" refers to the presence of an ethylenic carbon-carbon double bond (C═C) or a functional group derived therefrom in a compound. Therefore, examples of "vinyl" or "vinyl group-containing" may include, but not limited to, a structure containing a vinyl group, a styryl group, an allyl group, a vinylbenzyl group, a methacrylate group or the like. Unless otherwise specified, the position of the aforesaid functional group is not particularly limited and may be located at the terminal of a long-chain structure. Therefore, for example, a vinyl group-containing polyphenylene ether resin represents a polyphenylene ether resin containing a vinyl group, a styryl group, an allyl group, a vinylbenzyl group, a methacrylate group or the like, but not limited thereto.

As used herein, part(s) by weight represents weight part(s) in any weight unit, such as but not limited to gram, kilogram, pound and so on. For example, 100 parts by weight of a vinyl group-containing resin may represent 100 grams of the vinyl group-containing resin, 100 kilograms of the vinyl group-containing resin or 100 pounds of the vinyl group-containing resin, but not limited thereto. As used herein, if the amount of components is presented in a proportional relationship, the actual amount can be any amount that conforms to the proportional relationship.

The following embodiments and examples are illustrative in nature and are not intended to limit the present disclosure and its application. In addition, the present disclosure is not bound by any theory described in the background and summary above or the following embodiments or examples.

As described above, a main object of the present disclosure is to provide a resin composition, which comprises:

a vinyl group-containing resin; and a phosphorus-containing compound of Formula (1) or a prepolymer thereof;

wherein:

relative to 100 parts by weight of the vinyl group-containing resin, the phosphorus-containing compound of Formula (1) is 35 to 60 parts by weight; or relative to 100 parts by weight of the vinyl group-containing resin, the prepolymer of the phosphorus-containing compound of Formula (1) is 50 to 90 parts by weight;

Formula (1)

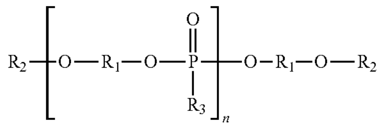

wherein $R_1$ each independently represent any divalent functional group of Formula (a) to Formula (d):

Formula (a)

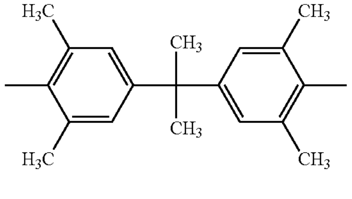

Formula (b)

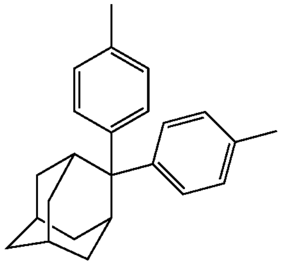

Formula (c)

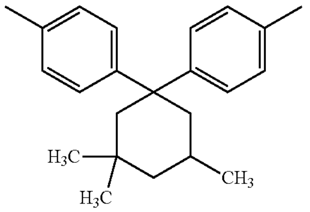

-continued

Formula (d)

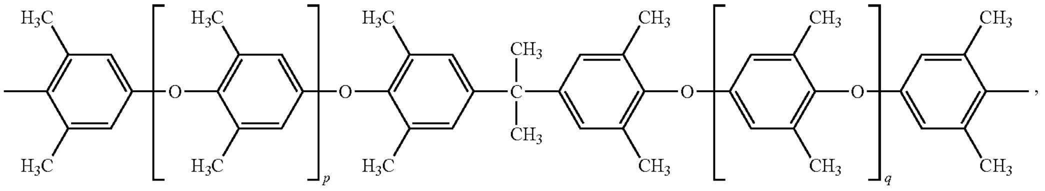

wherein p and q are each independently a positive integer, and p+q is between 2 and 11;

$R_2$ each independently represent any monovalent functional group of Formula (e) to Formula (f):

Formula (e)

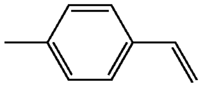

Formula (f)

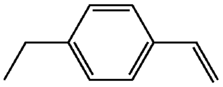

$R_3$ represents a phenyl group; and n represents a repeating number of unit in the brackets by which the phosphorus-containing compound of Formula (1) has a weight average molecular weight of between 500 and 10,000.

According to the present disclosure, unless otherwise specified, the type of the vinyl group-containing resin is not particularly limited and may include any resin containing an ethylenic carbon-carbon double bond or a functional group derived therefrom in its structure. For example, the vinyl group-containing resin may comprise, but not limited to, a vinyl group-containing polyphenylene ether resin, a maleimide resin, a compound of Formula (2), a vinyl group-containing polyolefin resin, triallyl isocyanurate or a combination thereof.

The vinyl group-containing polyphenylene ether resin may include but is not limited to a polyphenylene ether resin containing a vinyl group, an allyl group, a vinylbenzyl group, or a methacrylate group. For example, in one embodiment, the vinyl group-containing polyphenylene ether resin comprises a vinylbenzyl group-containing biphenyl polyphenylene ether resin, a methacrylate group-containing polyphenylene ether resin (i.e., methacryloyl group-containing polyphenylene ether resin), an allyl group-containing polyphenylene ether resin, a vinylbenzyl group-modified bisphenol A polyphenylene ether resin, a chain-extended vinyl group-containing polyphenylene ether resin or a combination thereof. For example, the vinyl group-containing polyphenylene ether resin may be a vinylbenzyl group-containing biphenyl polyphenylene ether resin with a number average molecular weight of about 1200 (such as OPE-2st 1200, available from Mitsubishi Gas Chemical Co., Inc.), a vinylbenzyl group-containing biphenyl polyphenylene ether resin with a number average molecular weight of about 2200 (such as OPE-2st 2200, available from Mitsubishi Gas Chemical Co., Inc.), a methacrylate group-containing polyphenylene ether resin with a number average molecular weight of about 1900 to 2300 (such as SA9000, available from Sabic), a vinylbenzyl group-modified bisphenol A polyphenylene ether resin with a number average molecular weight of about 2400 to 2800, a chain-extended vinyl group-containing polyphenylene ether resin with a number average molecular weight of about 2200 to 3000, or a combination thereof. The chain-extended vinyl group-containing polyphenylene ether resin may include various polyphenylene ether resins disclosed in the US Patent Application Publication No. 2016/0185904 A1, all of which are incorporated herein by reference in their entirety.

The maleimide resin may comprise 4,4'-diphenylmethane bismaleimide, polyphenylmethane maleimide (a.k.a. oligomer of phenylmethane maleimide), bisphenol A diphenyl ether bismaleimide, 3,3'-dimethyl-5,5'-diethyl-4,4'-diphenylmethane bismaleimide, 3,3'-dimethyl-5,5'-dipropyl-4,4'-diphenylmethane bismaleimide, m-phenylene bismaleimide, 4-methyl-1,3-phenylene bismaleimide, 1,6-bismaleimide-(2,2,4-trimethyl)hexane, N-2,3-xylylmaleimide, N-2,6-xylyl maleimide, N-phenylmaleimide, vinyl benzyl maleimide (VBM), maleimide containing a biphenyl structure, maleimide resin containing aliphatic long chain structure, prepolymer of diallyl compound and maleimide resin, prepolymer of multi-functional amine (i.e., an amine including two or more amino groups) and maleimide resin, prepolymer of acid phenol compound and maleimide resin, or a combination thereof. These components should be construed as including their modifications.

For example, examples of the maleimide resin include but are not limited to products such as BMI-1000, BMI-1000H, BMI-1100, BMI-1100H, BMI-2000, BMI-2300, BMI-3000, BMI-3000H, BMI-4000, BMI-5000, BMI-5100, BMI-TMH, BMI-7000, and BMI-7000H available from Daiwakasei Industry, products such as BMI-70 and BMI-80 available from K.I Chemical Industry Co., Ltd., or products such as MIR-3000 and MIR-5000 available from Nippon Kayaku. For example, examples of the maleimide resin containing aliphatic long chain structure (such as containing $C_5$ to $C_{50}$ aliphatic long chain structure) include, but are not limited to, products such as BMI-689, BMI-1400, BMI-1500, BMI-1700, BMI-2500, BMI-3000, BMI-5000 and BMI-6000 available from Designer Molecules Inc.

For example, in one embodiment, the vinyl group-containing polyolefin resin disclosed herein may include, but not limited to, styrene-butadiene-divinylbenzene terpolymer, styrene-butadiene-maleic anhydride terpolymer, vinyl-polybutadiene-urethane oligomer, styrene-butadiene copolymer (such as but not limited to styrene-butadiene-styrene copolymer), hydrogenated styrene-butadiene-styrene triblock copolymer, styrene-isoprene copolymer, maleic anhydride-butadiene copolymer, polybutadiene resin (i.e., homopolymer of butadiene), or a combination thereof.

In one embodiment, the resin composition of the present disclosure comprises a vinyl group-containing resin and a phosphorus-containing compound of Formula (1). In another embodiment, the resin composition of the present disclosure comprises a vinyl group-containing resin and a prepolymer of the phosphorus-containing compound of Formula (1). In another embodiment, the resin composition of the present disclosure comprises a vinyl group-containing resin, a phosphorus-containing compound of Formula (1) and a prepolymer of the phosphorus-containing compound of Formula (1).

For example, in one embodiment, the resin composition of the present disclosure comprises 100 parts by weight of a vinyl group-containing resin and 35 to 60 parts by weight of a phosphorus-containing compound of Formula (1). In another embodiment, the resin composition of the present disclosure comprises 100 parts by weight of a vinyl group-containing resin and 50 to 90 parts by weight of a prepolymer of the phosphorus-containing compound of Formula (1). In still another embodiment, the resin composition of the present disclosure comprises 100 parts by weight of a vinyl group-containing resin, 35 to 60 parts by weight of a phosphorus-containing compound of Formula (1) and 50 to 90 parts by weight of a prepolymer of the phosphorus-containing compound of Formula (1).

The phosphorus-containing compound of Formula (1) has reactive groups and contains phosphorus atoms in the structure, so it may be regarded as a reactive phosphorus-containing flame retardant. The phosphorus-containing compound of Formula (1) may be prepared by those skilled in the art without undue experimentation. For example, the reaction of (A) phenylphosphonic dichloride and (B) dihydroxyl compound (such as but not limited to bisxylenol A, bishydroxyadamantane, bisphenol TMC or dihydroxyl polyphenylene ether resin) was performed in the presence of a catalyst (such as but not limited to boron trifluoride diethyl etherate) and a phase transfer agent (such as but not limited to butyltriphenylphosphonium bromide), followed by adding (C) chlorostyrene or vinylbenzyl chloride to perform capping so as to obtain a phosphorus-containing compound of Formula (1), having a weight average molecular weight of between 500 and 10,000 and a phosphorus content of between 0.5% and 8.5%. In one embodiment, the molar ratio of the reactants (A), (B) and (C) may be between 1:2-2.5:3-3.5. In one embodiment, the aforementioned reaction was carried out at a temperature of 90° C.-100° C. for 4-6 hours to obtain a phosphorus-containing compound of Formula (1).

The phosphorus-containing compound of Formula (1) can also be made into a prepolymer by a prepolymerization reaction and used in the resin composition of the present disclosure. For example, the prepolymer may be prepared from a mixture subjected to a prepolymerization reaction, and the mixture comprises the phosphorus-containing compound of Formula (1) and a vinyl group-containing polyphenylene ether resin in a molar ratio of between 1:2 and 2:1. The prepolymerization reaction may be optionally carried out in the presence of a reaction initiator, such as but not limited to azobisisobutyronitrile (AIBN). The conditions of the prepolymerization reaction are not particularly limited. For example, the mixture can be prepolymerized at a temperature of 60° C. to 95° C. for 4 to 6 hours to obtain the prepolymer. In one embodiment, the reaction temperature of the prepolymerization reaction may be such as but not limited to 60° C., 62° C., 64° C., 65° C., 68° C., 70° C., 80° C., 82° C., 85° C., 88° C., 90° C. or 95° C., as well as specific point values between the aforesaid values. For the purpose of brevity and conciseness, not all specific point values are described and listed exhaustively herein. In one embodiment, the prepolymerization reaction has a reaction time of 4 to 6 hours, such as but not limited to 4 hours, 4.5 hours, 5 hours, 5.5 hours or 6 hours, as well as any specific point value between the aforesaid values. For the purpose of brevity and conciseness, not all specific point values are described and listed exhaustively herein.

Unless otherwise specified, according to the present disclosure, a prepolymer refers to a product with an intermediate molecular weight obtained by subjecting a monomer (e.g., a phosphorus-containing compound of Formula (1) and a vinyl group-containing polyphenylene ether resin) to a certain degree of reaction, the intermediate molecular weight being greater than the molecular weight of the monomer before reaction but less than the molecular weight of the final polymer obtained from a complete reaction; in addition, the prepolymer contains a reactive functional group capable of participating further polymerization to obtain the final polymer product which has been fully crosslinked or cured. The prepolymerization reaction of the phosphorus-containing compound of Formula (1) and a vinyl group-containing polyphenylene ether resin as used herein refers to a conversion rate of the phosphorus-containing compound of Formula (1) as a monomer or the vinyl group-containing polyphenylene ether resin as a monomer of greater than 0% and less than 100% (exclusive of 0% and 100%), such as but not limited to a conversion rate of between 10% and 90% (inclusive of 10% and 90%). Existence of some unreacted (e.g., not converted) monomers may increase the compatibility and crosslinking degree of the prepolymer in the resin composition. Specifically, a 0% conversion rate of the monomer represents no reaction of the monomer and therefore fails to form the prepolymer. Similarly, a 100% conversion rate of the monomer represents a complete reaction of the monomer and therefore also fails to form the prepolymer. To enable the reactants, i.e., the phosphorus-containing compound of Formula (1) and the vinyl group-containing polyphenylene ether resin, to undergo a pre-specified degree of the prepolymerization reaction to form the prepolymer with an intermediate molecular weight, the conversion rate of the prepolymerization reaction needs to be controlled in a range of greater than 0% and less than 100%, such as between 10% and 90% or between 30% and 80%, such as about 10%, 20%, 30%, 40%, 50%, 60%, 70%, 80% or 90%.

In addition to the vinyl group-containing resin and the phosphorus-containing compound of Formula (1) or a prepolymer thereof, the resin composition of the present disclosure may also optionally comprise an additive. For example, the additive may comprise a phosphorus-containing maleimide resin or a phosphorus-containing copolymer. For example, in one embodiment, relative to 100 parts by weight of the vinyl group-containing resin, the resin composition of the present disclosure may also optionally comprise 5 to 60 parts by weight of a phosphorus-containing maleimide resin, such as 5 parts by weight, 10 parts by weight, 15 parts by weight, 20 parts by weight, 25 parts by weight, 30 parts by weight, 35 parts by weight, 40 parts by weight, 45 parts by weight, 50 parts by weight, 55 parts by weight or 60 parts by weight. For example, in one embodiment, the resin composition of the present disclosure comprises 100 parts by weight of a vinyl group-containing resin, 35 to 60 parts by weight of a phosphorus-containing compound of Formula (1) and 5 to 60 parts by weight of a phosphorus-containing maleimide resin. For example, in one embodiment, the resin composition of the present disclosure comprises 100 parts by weight of a vinyl group-containing resin, 50 to 90 parts by weight of a prepolymer of the phosphorus-containing compound of Formula (1) and 5 to 45 parts by weight of a phosphorus-containing maleimide resin.

For example, in one embodiment, the phosphorus-containing maleimide resin was obtained by reacting a maleimide resin substituted by a 9,10-dihydro-9-oxa-10-phosphaphenanthrene-10-oxide (DOPO) group with aryl phosphonate.

For example, in one embodiment, the DOPO group-substituted maleimide resin has a structure as shown below:

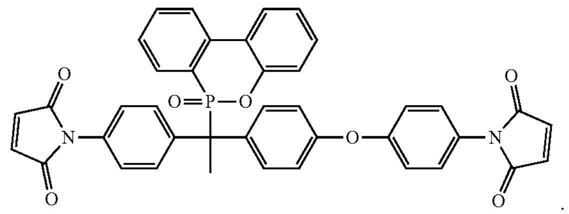 [SMILES: CC(c1ccc(Oc2ccc(N3C(=O)C=CC3=O)cc2)cc1)(c1ccc(N2C(=O)C=CC2=O)cc1)P1(=O)Oc2ccccc2-c2ccccc21]

For example in one embodiment, the aryl phosphonate has a structure as shown below:

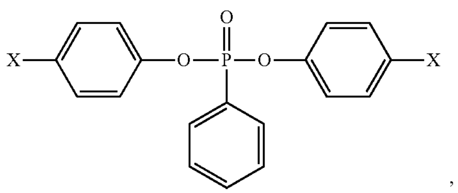

wherein X is vinyl or allyl group.

For example, in one embodiment, a DOPO group-substituted maleimide resin was reacted with an aryl phosphonate in a molar ratio of between 1:1 and 1:3 to prepare a phosphorus-containing maleimide resin. For example, in one embodiment, the phosphorus-containing maleimide resin has a number average molecular weight of between 500 and 5,000.

In one embodiment, for example, the resin composition of the present disclosure may further optionally comprise inorganic filler, curing accelerator, polymerization inhibitor, solvent, silane coupling agent, surfactant, coloring agent, toughening agent or a combination thereof. Unless otherwise specified, relative to 100 parts by weight of the vinyl group-containing resin, the content of any aforesaid component may be 1 to 300 parts by weight, such as 5, 10, 20, 30, 40, 50, 60, 70, 80, 90, 100, 150, 200, 250 or 300 parts by weight, such as 30 to 150 parts by weight or 200 to 300 parts by weight.

The inorganic filler may be any one or more inorganic fillers used for preparing a resin film, a prepreg, a laminate or a printed circuit board; examples of inorganic filler include but are not limited to silica (fused, non-fused, porous or hollow type), aluminum oxide, aluminum hydroxide, magnesium oxide, magnesium hydroxide, calcium carbonate, aluminum nitride, boron nitride, aluminum silicon carbide, silicon carbide, titanium dioxide, zinc oxide, zirconium oxide, mica, boehmite (AlOOH), calcined talc, talc, silicon nitride, calcined kaolin, hollow porous particle or a combination thereof. Moreover, the inorganic filler can be spherical, fibrous, plate-like, particulate, flake-like, whisker-like or a combination thereof in shape and can be optionally pretreated by a silane coupling agent. In some embodiments, the present disclosure uses the silica (SC2050) available from Admatechs.

For example, relative to 100 parts by weight of the vinyl group-containing resin, the amount of inorganic filler used in the present disclosure is not particularly limited, and may range from 10 parts by weight to 300 parts by weight, such as 10 parts by weight to 200 parts by weight or 80 parts by weight to 150 parts by weight.

The curing accelerator (including curing initiator) may comprise a catalyst, such as a Lewis base or a Lewis acid. The Lewis base may comprise any one or more of imidazole, boron trifluoride-amine complex, ethyltriphenyl phosphonium chloride, 2-methylimidazole (2MI), 2-phenyl-1H-imidazole (2PZ), 2-ethyl-4-methylimidazole (2E4MI), triphenylphosphine (TPP) and 4-dimethylaminopyridine (DMAP). The Lewis acid may comprise metal salt compounds, such as those of manganese, iron, cobalt, nickel, copper and zinc, such as zinc octanoate or cobalt octanoate.

The curing accelerator may also encompass curing initiator such as a peroxide capable of producing free radicals, and examples of the curing initiator may comprise but not limited to: benzoyl peroxide, dicumyl peroxide, 2,5-dimethyl-2,5-di(t-butylperoxy)hexane, 2,5-dimethyl-2,5-di(t-butylperoxy)-3-hexyne, di-t-butyl peroxide, di(t-butylperoxyisopropyl)benzene, di(t-butylperoxy)phthalate, di(t-butylperoxy)isophthalate, t-butyl peroxybenzoate, 2,2-di(t-butylperoxy)butane, 2,2-di(t-butylperoxy)octane, 2,5-dimethyl-2,5-di(benzoyl peroxy)hexane, lauroyl peroxide, t-hexyl peroxypivalate, dibutylperoxy isopropylbenzene, bis (4-t-butylcyclohexyl) peroxydicarbonate or a combination thereof. For example, relative to 100 parts by weight of the vinyl group-containing resin, the amount of curing accelerator used in the present disclosure may range from 0.01 to 5 parts by weight, preferably 0.5 to 2 parts by weight.

The polymerization inhibitor may include any one or more polymerization inhibitors used for preparing a resin film, a prepreg, a laminate or a printed circuit board. The polymerization inhibitor is used to inhibit the polymerization reaction, and examples thereof are not particularly limited, which may include various molecule type polymerization inhibitors, stable free radical type polymerization inhibitors or a combination thereof known in the field to which this disclosure pertains. For example, molecule type polymerization inhibitors suitable for the present disclosure include but are not limited to phenol, hydroquinone, 4-tert-butylcatechol, benzoquinone, chloroquinone, 1,4-naphthoquinone, trimethylquinone, aniline, nitrobenzene, $Na_2S$, $FeCl_3$, $CuCl_2$ or a combination thereof. For example, stable free radical type polymerization inhibitors suitable for the present disclosure include but are not limited to 1,1-diphenyl-2-picrylhydrazyl radical (DPPH), triphenylmethyl radical or a combination thereof.

The purpose of adding solvent is to change the solid content of the resin composition and to adjust the viscosity of the resin composition. For example, the solvent may comprise, but not limited to, methanol, ethanol, ethylene glycol monomethyl ether, acetone, butanone (methyl ethyl ketone), methyl isobutyl ketone, cyclohexanone, toluene, xylene, methoxyethyl acetate, ethoxyethyl acetate, propoxyethyl acetate, ethyl acetate, dimethylformamide, dimethylacetamide, propylene glycol methyl ether, or a mixture thereof. For example, relative to 100 parts by weight of the vinyl group-containing resin, the amount of solvent used in the present disclosure may preferably range from 80 to 120 parts by weight.

The silane coupling agent may include various silanes (such as but not limited to siloxane) or a combination thereof and may be further categorized according to the functional groups into amino silane, epoxide silane, vinyl silane, acrylate silane, methacrylate silane, hydroxyl silane, isocyanate silane, methacryloxy silane and acryloxy silane.

The purpose of surfactant used herein is to ensure uniform distribution of the inorganic filler in the resin composition.

The coloring agent suitable for the present disclosure may comprise, but not limited to, dye or pigment.

The purpose of adding toughening agent is to improve the toughness of the resin composition. The toughening agent may comprise, but not limited to, rubber resin, carboxyl-terminated butadiene acrylonitrile rubber (CTBN rubber), core-shell rubber, or a combination thereof.

The resin composition according to the present disclosure may be used to make various articles. For example, the article made from the resin composition disclosed herein may comprise a prepreg, a resin film, a laminate or a printed circuit board.

The article made from the resin composition may be a prepreg, which comprises a reinforcement material and a layered structure disposed thereon. The layered structure is formed by heating the resin composition at a high temperature to the B-stage. Suitable baking temperature for making a prepreg may be for example 90° C. to 150° C., preferably 100° C. to 120° C. For example, the reinforcement material may be any one of a fiber material, woven fabric, and non-woven fabric, and the woven fabric preferably comprises fiberglass fabrics. Types of fiberglass fabrics are not particularly limited and may be any commercial fiberglass fabric used for various printed circuit boards, such as E-glass fabric, D-glass fabric, S-glass fabric, T-glass fabric, L-glass fabric or Q-glass fabric, wherein the fiber may comprise yarns and rovings, in spread form or standard form. Non-woven fabric preferably comprises liquid crystal polymer non-woven fabric, such as polyester non-woven fabric, polyurethane non-woven fabric and so on, but not limited thereto. Woven fabric may also comprise liquid crystal resin woven fabric, such as polyester woven fabric, polyurethane woven fabric and so on, but not limited thereto. The reinforcement material may increase the mechanical strength of the prepreg. In one preferred embodiment, the reinforcement material can be optionally pre-treated by a silane coupling agent. The prepreg may be further heated and cured to the C-stage to form an insulation layer.

The article made from the resin composition may be a resin film which is prepared by heating and baking the resin composition to the semi-cured state (B-stage). The resin composition may be selectively coated on a polyethylene terephthalate film (PET film), a polyimide film (PI film), or a liquid crystal resin film, followed by heating and baking to semi-cure the resin composition to convert the resin composition into a resin film. The resin composition may also be coated on a copper foil, followed by baking and heating to the semi-cured state to obtain a resin-coated copper (RCC), also known as a resin film with copper foil.

The resin composition can be used to make a laminate, which comprises two metal foils and an insulation layer disposed between the metal foils, wherein the insulation layer is formed by curing the prepreg or resin film at high temperature and high pressure to the C-stage, a suitable curing temperature being for example between 190° C. and 230° C. and preferably between 200° C. and 220° C. and a suitable curing time being 60 to 180 minutes and preferably 90 to 120 minutes. The metal foil may comprise copper, aluminum, nickel, platinum, silver, gold or alloy thereof, such as a copper foil.

Preferably, the laminate is a copper-clad laminate (CCL).

The laminate may be further processed by trace formation processes to provide a printed circuit board.

In one or more embodiments, the articles made from the resin composition disclosed herein may have at least one, preferably at least two, more or all, of the following properties:

- a water absorption ratio as measured by reference to IPC-TM-650 2.6.16.1 of less than or equal to 0.31%, such as between 0.16% and 0.31% or between 0.21% and 0.28%;
- a dielectric constant as measured by reference to JIS $C_{2565}$ at 10 GHz of less than or equal to 3.27, such as between 2.97 and 3.18 or between 3.02 and 3.27;
- a dissipation factor as measured by reference to JIS $C_{2565}$ at 10 GHz of less than or equal to 0.00287, such as between 0.00204 and 0.00287 or between 0.00225 and 0.00287;
- an elongation as measured by reference to ASTM D412 of greater than or equal to 6.95%, such as between 6.95% and 9.24%;
- a copper foil peeling strength as measured by reference to IPC-TM-650 2.4.8 of greater than or equal to 3.07 lb/in, such as between 3.07 lb/in and 3.39 lb/in or between 3.15 lb/in and 3.45 lb/in; and
- a glass transition temperature as measured by reference to IPC-TM-650 2.4.24.4 of greater than or equal to 182° C., such as between 182° C. and 216° C. or between 191° C. and 228° C.

Methods for measuring the aforesaid properties will be elaborated in detail below.

Raw materials below were used to prepare the resin compositions of various Examples and Comparative Examples of the present disclosure according to the amount listed in Table 1 to Table 10 and further fabricated to prepare test samples. The resin compositions of Examples E1 to E17 comprise a vinyl group-containing resin and a phosphorus-containing compound of Formula (1), and the resin compositions of Examples E18 to E38 comprise a vinyl group-containing resin and a prepolymer of the phosphorus-containing compound of Formula (1).

Materials and reagents used in Preparation Examples, Synthesis Examples, Examples and Comparative Examples disclosed herein are listed below:

- Phosphorus-containing compounds (1-1) to (1-9): as described in Preparation Example 1-1 to Preparation Example 1-9.
- Phenylphosphonic dichloride: commercially available.
- Bisxylenol A (i.e., 2,2-bis(4-hydroxy-3,5-dimethylphenyl) propane): commercially available.
- 4-Chlorostyrene: commercially available.
- 2,2-Bis(4-hydroxyphenyl)adamantanel: commercially available.
- Bisphenol TMC (i.e., 1,1-bis(4-hydroxyphenyl)-3,3,5-trimethylcyclohexane): commercially available.
- SA90: dihydroxyl polyphenylene ether resin, available from Sabic.
- 4-Vinylbenzyl chloride: commercially available.
- Bisphenol A (i.e., 2,2-bis(4-hydroxyphenyl) propane): available from Sigma-Aldrich.
- Methylphosphonic dichloride: commercially available.
- Methacryloylchloride: commercially available.
- Methacrylate group-containing polyphenylene ether resin, abbreviated as PPO A, made by Preparation Example 2.
- OPE-2st 2200: bis-vinylbenzyl-terminated polyphenylene ether resin, available from Mitsubishi Gas Chemical Co., Inc.
- SA9000: methacrylate group-containing polyphenylene ether resin, available from Sabic.

BMI-70: aromatic bismaleimide resin, available from K.I Chemical Industry Co., Ltd.

MIR-5000: bismaleimide, available from Nippon Kayaku.

Compound of Formula (2): made by Preparation Example 3.

TAIC: triallyl isocyanurate, commercially available.

Ricon 100: styrene-butadiene copolymer, available from Cray Valley.

B-1000: polybutadiene resin, available from Nippon Soda Co., Ltd.

Ricon184MA6: styrene-butadiene-maleic anhydride terpolymer resin, available from Cray Valley.

H1052: hydrogenated styrene-butadiene-styrene triblock copolymer, available from Asahi KASEI.

Additive (A): phosphorus-containing maleimide resin, as described in Preparation Example 4-1, having a number average molecular weight of between 500 and 5,000.

Additive (B): phosphorus-containing maleimide resin, as described in Preparation Example 4-2, having a number average molecular weight of between 500 and 5,000.

Additive (C): phosphorus-containing copolymer, as described in Preparation Example 4-3.

Additive (D): phosphorus-containing copolymer, as described in Preparation Example 4-4.

SC2050: silica, available from Admatechs.

25B: 2,5-dimethyl-2,5-di(t-butylperoxy)-3-hexyne, available from NOF Corporation.

Toluene: commercially available.

SPV-100: phosphazene compound, commercially available.

OPE-2st 1200: bis-vinylbenzyl-terminated polyphenylene ether resin, available from Mitsubishi Gas Chemical Co., Inc.

Cyclic phosphazene mixture: commercially available, including the following compounds of Formula (3-1), Formula (3-2) and Formula (3-3), wherein the molar ratio of the Formula (3-1), Formula (3-2) and Formula (3-3) is 50-60:35-45:0-5.

Formula (3-1)

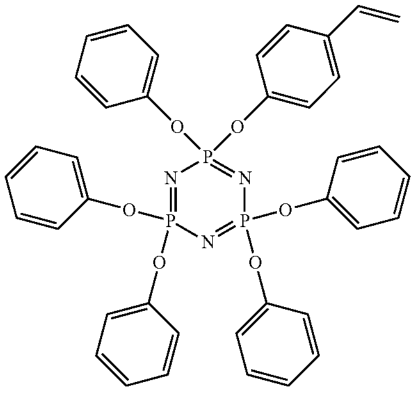

-continued

Formula (3-2)

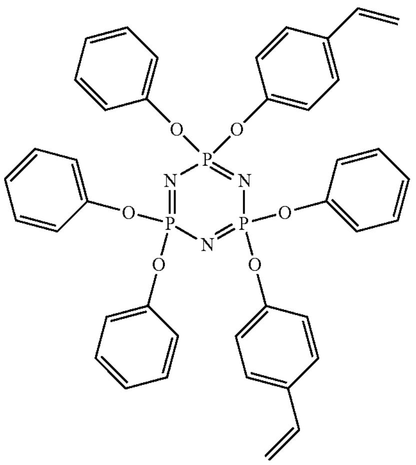

Formula (3-3)

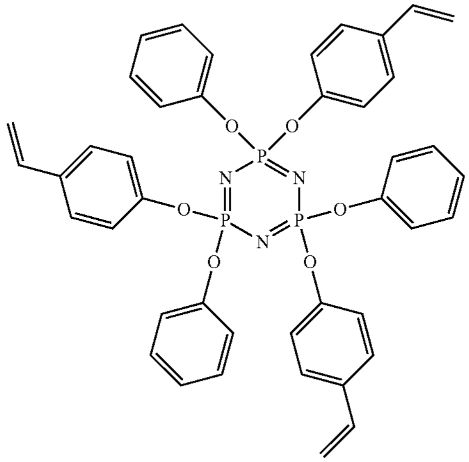

Prepolymer 1 to Prepolymer 13: as described in Synthesis Example 1 to Synthesis Example 13.

Preparation Example 1-1

Phenylphosphonyl dichloride and bisxylenol A in a molar ratio of 1:2, 0.01 wt % to 0.1 wt % of catalyst boron trifluoride diethyl etherate (relative to the total weight of the above two compounds), 0.5 wt % to 1.5 wt % of phase transfer agent butyltriphenylphosphonium bromide (BTPPB) and an appropriate amount of mixed solvent (toluene and methyl ethyl ketone in a weight ratio of 1:1) were added to the stirred tank, heated to 75° C. and stirred until dissolved, then heated to the 90 to 100° C., followed by adding an appropriate amount of NaOH and deionized water and stirring at constant temperature for 4 to 6 hours. Then the mixture was cooled to 70° C., 3 moles of 4-chlorostyrene (relative to the phenylphosphonyl dichloride) was added, and the reaction was stirred at constant temperature for 4 to 6 hours. Then the mixture was cooled to room temperature for neutralization reaction, and an appropriate amount of phosphoric acid and deionized water were added. After three times of extraction, the solvent was removed by distillation under reduced pressure to obtain a brown solid phosphorus-containing compound (1-1), which has the skeleton of Formula (1), wherein $R_1$ has the structure of Formula (a), $R_2$ has the structure of Formula (e), $R_3$ is phenyl, its weight average molecular weight is between 800 and 1,000, and it belongs to the phosphor-containing compound of Formula (1) of the present disclosure.

Preparation Example 1-2

Same as Preparation Example 1-1, except that bisxylenol A was replaced with 2,2-bis(4-hydroxyphenyl)adamantanel to obtain a phosphorus-containing compound (1-2), which has the skeleton of Formula (1), wherein $R_1$ has the structure of Formula (b), $R_2$ has the structure of Formula (e), $R_3$ is phenyl, its weight average molecular weight is between 8,500 and 9,500, and it belongs to the phosphorus-containing compound of Formula (1) of the present disclosure.

Preparation Example 1-3

Same as Preparation Example 1-1, except that bisxylenol A was replaced with bisphenol TMC to obtain a phosphorus-containing compound (1-3), which has the skeleton of Formula (1), wherein $R_1$ has the structure of Formula (c), $R_2$ has the structure of Formula (e), $R_3$ is phenyl, its weight average molecular weight is between 3,000 and 4,000, and it belongs to the phosphorus-containing compound of Formula (1) of the present disclosure.

Preparation Example 1-4

Same as Preparation Example 1-1, except that bisxylenol A was replaced with SA90 to obtain a phosphorus-containing compound (1-4), which has the skeleton of Formula (1), wherein $R_1$ has the structure of Formula (d), $R_2$ has the structure of Formula (e), $R_3$ is phenyl, its weight average molecular weight is between 3,000 and 4,000, and it belongs to the phosphorus-containing compound of Formula (1) of the present disclosure.

Preparation Example 1-5

Same as Preparation Example 1-1, except that 4-chlorostyrene was replaced with 4-vinylbenzyl chloride to obtain a phosphorus-containing compound (1-5), which has the skeleton of Formula (1), wherein $R_1$ has the structure of Formula (a), $R_2$ has the structure of Formula (f), $R_3$ is phenyl, its weight average molecular weight is between 3,000 and 4,000, and it belongs to the phosphorus-containing compound of Formula (1) of the present disclosure.

Preparation Example 1-6

Same as Preparation Example 1-1, except that bisxylenol A was replaced with bisphenol A to obtain a phosphorus-containing compound (1-6), which has the skeleton of Formula (1), wherein $R_1$ has the structure as shown below, $R_2$ has the structure of Formula (e), $R_3$ is phenyl, and it does not belong to the phosphorus-containing compound of Formula (1) of the present disclosure.

$R_1$:
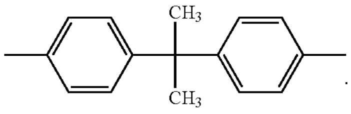
.

Preparation Example 1-7

Same as Preparation Example 1-1, except that phenylphosphonic dichloride was replaced with methylphosphonic dichloride to obtain a phosphorus-containing compound (1-7), which has the skeleton of Formula (1), wherein $R_1$ has the structure of Formula (a), $R_2$ has the structure of Formula (e), $R_3$ is methyl, and it does not belong to the phosphorus-containing compound of Formula (1) of the present disclosure.

Preparation Example 1-8

Same as Preparation Example 1-1, except that 4-chlorostyrene was replaced with methacryloyl chloride to obtain a phosphorus-containing compound (1-8), which has the skeleton of Formula (1), wherein $R_1$ has the structure of Formula (a), $R_2$ has the structure as shown below, $R_3$ is phenyl, and it does not belong to the phosphorus-containing compound of Formula (1) of the present disclosure.

$R_2$:
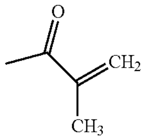
.

Preparation Example 1-9

Same as Preparation Example 1-1, except that 4-chlorostyrene was not used and a phosphorus-containing compound (1-9) was obtained, which has the skeleton of Formula (1), wherein $R_1$ has the structure of Formula (a), $R_2$ is hydrogen, $R_3$ is phenyl, and it does not belong to the phosphorus-containing compound of Formula (1) of the present disclosure.

Preparation Example 2

400 g (0.2 mol) of SA90, 17.5 g (0.1 mol) of α,α'-dichloro-p-xylene, 33.9 g (0.01 mol) of tetrabutylphosphonium bromide and 600 g of toluene were added into a stirred tank, heated to 75° C. and stirred until fully dissolved and well mixed. After heating to 95° C., 45 g (1.125 mol) of NaOH and 33 g of deionized water were added, followed by stirring for 6 hours. The mixture was cooled to 70° C. and then added with 36.6 g (0.35 mol) of methacryloyl chloride, followed by stirring for 4 hours. After reaction for 4 hours, the mixture was cooled to room temperature and subjected to neutralization, with the addition of 8.8 g (0.09 mol) of phosphoric acid and 165 g of deionized water. The solution was allowed to stand still to form layer separation. 330 g of deionized water was added and stirred, and waste liquid was removed in three stages. Finally, the solvent was removed by distillation under reduced pressure to obtain the methacrylate group-containing polyphenylene ether resin, abbreviated as PPO A.

Preparation Example 3

296 parts by weight of 2-bromoethylbenzene (manufactured by Tokyo Chemical Industry Co., Ltd.), 70 parts by weight of α,α'-dichloro-p-xylene (manufactured by Tokyo Chemical Industry Co., Ltd.) and 18.4 parts by weight of methanesulfonic acid (manufactured by Tokyo Chemical Industry Co., Ltd.) were reacted at 130° C. for 8 hours, followed by being cooled to room temperature, neutralized with aqueous sodium hydroxide solution and extracted with 1200 parts by weight of toluene. The organic layer was washed with water. The solvent and excess 2-bromoethylbenzene were removed by distillation under heating and reduced pressure to obtain the intermediate. The molar ratio of 2-bromoethylbenzene to α,α'-dichloro-p-xylene may be 4:1; methanesulfonic acid was used as an acidic catalyst and may be replaced by other acidic catalysts such as hydrochloric acid and phosphoric acid; and the reaction conditions may be 40 to 180° C. for 0.5 to 20 hours.

22 parts by weight of the aforesaid intermediate, 50 parts by weight of toluene (other aromatic solvents may also be used, such as xylene), 150 parts by weight of dimethyl sulfoxide (other aprotic polar solvents may also be used, such as dimethyl sulfone), 15 parts by weight of water and 5.4 parts by weight of sodium hydroxide (other alkaline catalysts may also be used, such as potassium hydroxide and potassium carbonate) were reacted at 40° C. for 5 hours, followed by being cooled to room temperature, and then added with 100 parts by weight of toluene. The organic layer was washed with water, and the solvent was removed by distillation under heating and reduced pressure to obtain the compound of Formula (2), wherein m is an integer of 1 to 20.

Preparation Example 4-1

A DOPO group-substituted maleimide resin (the structure as shown below, purchased from Union Chemical Ind. Co.) and bis(4-allylphenyl)phenylphosphonate (manufactured as described below) in a molar ratio of 1:1, 0.01-0.1 wt % of zinc octanoate (relative to the total weight of the aforesaid compounds) and an appropriate amount of methyl ethyl ketone were sequentially added to a reaction flask, the temperature was raised to 75° C. while stirring until the mixture was well-mixed, and then the temperature was raised to 95° C. for reacting at the constant temperature for 6 hours to obtain a phosphorus-containing maleimide resin with a solid content of about 60%-70%.

The structure of the DOPO group-substituted maleimide resin is as shown below:

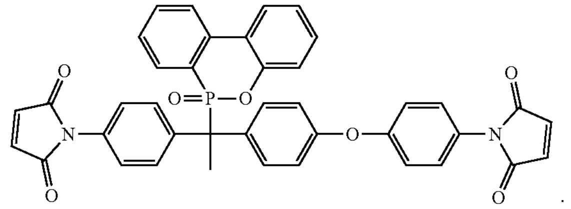 [SMILES: CC(c1ccc(Oc2ccc(N3C(=O)C=CC3=O)cc2)cc1)(c1ccc(N2C(=O)C=CC2=O)cc1)P1(=O)Oc2ccccc2-c2ccccc21]

Preparation of bis(4-allylphenyl)phenylphosphonate: 2.0-2.1 mol of 4-allylphenol, 150 ml of dry acetonitrile and 5 ml of triethylamine were sequentially added to a reaction flask, which was stirred at room temperature while 1 mol of phenylphosphonic dichloride was added dropwise to the reaction system within 60 minutes. After the dropwise addition was completed, the temperature was raised to 85-90° C. to react for 24 hours. Afterwards, triethylamine hydrochloride was filtered off, the filtrate was concentrated by a rotary evaporator to remove part of the solvent, and then poured into deionized water to precipitate solid. After suction filtration, the obtained product was washed three times with cold tetrahydrofuran and distilled water successively, and then dried in vacuum at 50° C. for 48 hours to obtain bis(4-allylphenyl)phenylphosphonate.

Preparation Example 4-2

Substantially the same as Preparation Example 4-1, except that bis(4-allyl phenyl)phenylphosphonate was replaced by bis(4-vinylphenyl)phenylphosphonate (prepared by the method described as below), and a phosphorus-containing maleimide resin with a solid content of about 60%-70% can be obtained.

Preparation of bis(4-vinylphenyl)phenylphosphonate: 2.0-2.1 mol of p-vinylphenol, 150 ml of dry acetonitrile and 5 ml of triethylamine were sequentially added to a reaction flask, which was stirred at room temperature while 1 mol of phenylphosphonic dichloride was added dropwise to the reaction system within 60 minutes. After the dropwise addition was completed, the temperature was raised to 85-90° C. to react for 24 hours. Afterwards, triethylamine hydrochloride was filtered off, the filtrate was concentrated by a rotary evaporator to remove part of the solvent, and then poured into deionized water to precipitate solid. After suction filtration, the obtained product was washed three times with cold tetrahydrofuran and distilled water successively, and then dried in vacuum at 50° C. for 48 hours to obtain bis(4-vinylphenyl)phenylphosphonate.

Preparation Example 4-3

1 mol of divinylbenzene, 1 mol of 1,2-bis(4-vinylphenyl) ethane (BVPE), 1 mol of bis(4-allylphenyl)phenylphosphonate, 0.01-0.1 wt % of zinc octanoate (relative to the total weight of the aforesaid compounds) and an appropriate amount of methyl ethyl ketone were sequentially added to a reaction flask, the temperature was raised to 75° C. while stirring until the mixture was well-mixed, and then the temperature was raised to 95° C. for reacting at the constant temperature for 6 hours to obtain a phosphorus-containing copolymer with a solid content of about 60%-70%.

Preparation Example 4-4

Substantially the same as Preparation Example 4-3, except that bis(4-allylphenyl)phenylphosphonate was replaced by bis(4-vinylphenyl)phenyl phosphonate, a phosphorus-containing copolymer with a solid content of about 60%-70% can be obtained.

Synthesis Example 1

Phosphorus-containing compound (1-1) and OPE-2st 1200 in a molar ratio of 1:2, 0.01-0.1 wt % of azobisisobutyronitrile (AIBN, relative to the total weight of the aforesaid compounds) and an appropriate amount of methyl ethyl ketone were added to a three-necked flask, and the temperature was raised to 60° C. to 95° C. for reacting at the constant temperature for 4 to 6 hours to obtain a prepolymer solution with a solid content of about 55%-65%, which is the Prepolymer 1 of the present disclosure.

Synthesis Example 2 to Synthesis Example 5

Substantially the same as Synthesis Example 1, except that the phosphorus-containing compound (1-1) was replaced by the phosphorus-containing compound (1-2) to the phosphorus-containing compound (1-5) respectively, and the Prepolymer 2 to Prepolymer 5 of the present disclosure were respectively obtained after synthesis.

Synthesis Example 6

Substantially the same as Synthesis Example 1, except that OPE-2st 1200 was replaced by SA9000, and the Prepolymer 6 of the present disclosure was obtained after synthesis.

Synthesis Example 7

Substantially the same as Synthesis Example 1, except that the molar ratio of the phosphorus-containing compound (1-1) and OPE-2st 1200 was changed from 1:2 to 1:1, and the Prepolymer 7 of the present disclosure was obtained after synthesis.

Synthesis Example 8

Substantially the same as Synthesis Example 1, except that the molar ratio of the phosphorus-containing compound (1-1) and OPE-2st 1200 was changed from 1:2 to 2:1, and the Prepolymer 8 of the present disclosure was obtained after synthesis.

Synthesis Example 9

Substantially the same as Synthesis Example 1, except that the phosphorus-containing compound (1-1) was replaced by SPV-100, and the Prepolymer 9 was obtained after synthesis.

Synthesis Example 10

Substantially the same as Synthesis Example 1, except that the phosphorus-containing compound (1-1) was replaced by a cyclic phosphazene mixture, and the Prepolymer 10 was obtained after synthesis.

Synthesis Example 11

Substantially the same as Synthesis Example 1, except that the phosphorus-containing compound (1-1) was replaced by a phosphorus-containing compound (1-6), and the Prepolymer 11 was obtained after synthesis.

Synthesis Example 12

Substantially the same as Synthesis Example 1, except that the phosphorus-containing compound (1-1) was replaced by a phosphorus-containing compound (1-7), and the Prepolymer 12 was obtained after synthesis.

Synthesis Example 13

Substantially the same as Synthesis Example 1, except that the phosphorus-containing compound (1-1) was replaced by a phosphorus-containing compound (1-8), and the Prepolymer 13 was obtained after synthesis.

TABLE 1

Resin compositions of Examples (in part by weight) and test results

| Component | Name | E1 | E2 | E3 | E4 | E5 | E6 |
|---|---|---|---|---|---|---|---|
| vinyl group-containing resin | PPO A | | | 80 | 70 | | |
| | OPE-2st 2200 | 100 | 50 | | | | 35 |
| | SA9000 | | 50 | | | 70 | 30 |
| | BMI-70 | | | 10 | | | |
| | MIR-5000 | | | 10 | | | |
| | Formula (2) | | | | 30 | | |
| | TAIC | | | | | 30 | 20 |
| | Ricon 100 | | | | | | 13 |
| | B-1000 | | | | | | |
| | Ricon184MA6 | | | | | | 2 |
| | H1052 | | | | | | |
| phosphorus-containing compound | (1-1) | 45 | 45 | 45 | 45 | 45 | 45 |
| | (1-2) | | | | | | |
| | (1-3) | | | | | | |
| | (1-4) | | | | | | |
| | (1-5) | | | | | | |
| | (1-6) | | | | | | |
| | (1-7) | | | | | | |
| | (1-8) | | | | | | |
| | (1-9) | | | | | | |
| additive | (A) | | | | | | |
| | (B) | | | | | | |
| | (C) | | | | | | |
| | (D) | | | | | | |
| filler | SC2050 | 120 | 120 | 120 | 120 | 120 | 120 |
| initiator | 25B | 1 | 1 | 1 | 1 | 1 | 1 |
| solvent | toluene | 100 | 100 | 100 | 100 | 100 | 100 |

| Property | Unit | E1 | E2 | E3 | E4 | E5 | E6 |
|---|---|---|---|---|---|---|---|
| PCT water absorption ratio | % | 0.27 | 0.31 | 0.27 | 0.18 | 0.21 | 0.23 |
| dielectric constant | none | 3.11 | 3.15 | 3.18 | 3.14 | 3.11 | 3.16 |
| dissipation factor | none | 0.00287 | 0.00267 | 0.00260 | 0.00285 | 0.00271 | 0.00258 |
| elongation | % | 7.51 | 7.56 | 7.23 | 7.87 | 7.89 | 8.92 |
| copper foil peeling strength | lb/in | 3.25 | 3.07 | 3.09 | 3.15 | 3.33 | 3.25 |
| glass transition temperature | ° C. | 191 | 188 | 185 | 182 | 192 | 195 |

TABLE 2

Resin compositions of Examples (in part by weight) and test results

| Component | Name | E7 | E8 | E9 | E10 | E11 | E12 |
|---|---|---|---|---|---|---|---|
| vinyl group-containing resin | PPO A | 50 | | | | | |
| | OPE-2st 2200 | | 100 | 100 | 100 | 100 | 100 |
| | SA9000 | | | | | | |
| | BMI-70 | 10 | | | | | |
| | MIR-5000 | | | | | | |
| | Formula (2) | | | | | | |
| | TAIC | 30 | | | | | |
| | Ricon 100 | | | | | | |
| | B-1000 | 7 | | | | | |
| | Ricon184MA6 | 1 | | | | | |
| | H1052 | 2 | | | | | |
| phosphorus-containing compound | (1-1) | 45 | 35 | 60 | | | |
| | (1-2) | | | | 45 | | |
| | (1-3) | | | | | 45 | |
| | (1-4) | | | | | | 45 |
| | (1-5) | | | | | | |
| | (1-6) | | | | | | |
| | (1-7) | | | | | | |
| | (1-8) | | | | | | |
| | (1-9) | | | | | | |
| additive | (A) | | | | | | |
| | (B) | | | | | | |
| | (C) | | | | | | |
| | (D) | | | | | | |
| filler | SC2050 | 120 | 120 | 120 | 120 | 120 | 120 |
| initiator | 25B | 1 | 1 | 1 | 1 | 1 | 1 |
| solvent | toluene | 100 | 100 | 100 | 100 | 100 | 100 |
| **Property** | **Unit** | **E7** | **E8** | **E9** | **E10** | **E11** | **E12** |
| PCT water absorption ratio | % | 0.24 | 0.29 | 0.26 | 0.21 | 0.21 | 0.25 |
| dielectric constant | none | 3.15 | 3.11 | 3.16 | 3.02 | 3.13 | 3.12 |
| dissipation factor | none | 0.00271 | 0.00283 | 0.00284 | 0.00235 | 0.00282 | 0.00242 |
| elongation | % | 9.02 | 7.01 | 7.72 | 7.34 | 7.39 | 9.24 |
| copper foil peeling strength | lb/in | 3.29 | 3.31 | 3.35 | 3.21 | 3.27 | 3.26 |
| glass transition temperature | ° C. | 192 | 187 | 185 | 193 | 197 | 192 |

TABLE 3

Resin compositions of Examples (in part by weight) and test results

| Component | Name | E13 | E14 | E15 | E16 | E17 |
|---|---|---|---|---|---|---|
| vinyl group-containing resin | PPO A | | | | 15 | 15 |
| | OPE-2st 2200 | 100 | 100 | 100 | 20 | 20 |
| | SA9000 | | | | 10 | 15 |
| | BMI-70 | | | | 15 | 10 |
| | MIR-5000 | | | | 10 | 17 |
| | Formula (2) | | | | 12 | 5 |
| | TAIC | | | | 5 | 5 |
| | Ricon 100 | | | | 5 | 5 |
| | B-1000 | | | | 5 | 5 |
| | Ricon184MA6 | | | | 1.5 | 1.5 |
| | H1052 | | | | 1.5 | 1.5 |
| phosphorus-containing compound | (1-1) | | 45 | 45 | 5 | 5 |
| | (1-2) | | | | 5 | 5 |
| | (1-3) | | | | 5 | 5 |
| | (1-4) | | | | 20 | 10 |
| | (1-5) | 45 | | | 10 | 20 |
| | (1-6) | | | | | |
| | (1-7) | | | | | |
| | (1-8) | | | | | |
| | (1-9) | | | | | |
| additive | (A) | | 20 | | 5 | 15 |
| | (B) | | | 20 | 5 | 15 |
| | (C) | | | | 10 | 20 |
| | (D) | | | | 15 | 10 |
| filler | SC2050 | 120 | 120 | 120 | 80 | 150 |
| initiator | 25B | 1 | 1 | 1 | 2 | 0.5 |
| solvent | toluene | 100 | 100 | 100 | 80 | 120 |

TABLE 3-continued

| Resin compositions of Examples (in part by weight) and test results | | | | | | |
|---|---|---|---|---|---|---|
| Property | Unit | E13 | E14 | E15 | E16 | E17 |
| PCT water absorption ratio | % | 0.23 | 0.29 | 0.28 | 0.17 | 0.16 |
| dielectric constant | none | 3.10 | 3.12 | 3.12 | 2.98 | 2.97 |
| dissipation factor | none | 0.00221 | 0.00215 | 0.00214 | 0.00207 | 0.00204 |
| elongation | % | 6.95 | 7.08 | 7.08 | 9.15 | 9.17 |
| copper foil peeling strength | lb/in | 3.37 | 3.39 | 3.39 | 3.32 | 3.39 |
| glass transition temperature | ° C. | 193 | 211 | 213 | 213 | 216 |

TABLE 4

| Resin compositions of Comparative Examples (in part by weight) and test results | | | | | | | |
|---|---|---|---|---|---|---|---|
| Component | Name | C1 | C2 | C3 | C4 | C5 | C6 |
| vinyl group-containing resin | PPO A | | | | | | |
| | OPE-2st 2200 | 100 | 100 | 100 | 100 | 100 | 100 |
| | SA9000 | | | | | | |
| | BMI-70 | | | | | | |
| | MIR-5000 | | | | | | |
| | Formula (2) | | | | | | |
| | TAIC | | | | | | |
| | Ricon 100 | | | | | | |
| | B-1000 | | | | | | |
| | Ricon184MA6 | | | | | | |
| | H1052 | | | | | | |
| phosphorus-containing compound | (1-1) | | | | | | |
| | (1-2) | | | | | 30 | 65 |
| | (1-3) | | | | | | |
| | (1-4) | | | | | | |
| | (1-5) | | | | | | |
| | (1-6) | 45 | | | | | |
| | (1-7) | | 45 | | | | |
| | (1-8) | | | 45 | | | |
| | (1-9) | | | | 45 | | |
| additive | (A) | | | | | | |
| | (B) | | | | | | |
| | (C) | | | | | | |
| | (D) | | | | | | |
| filler | SC2050 | 120 | 120 | 120 | 120 | 120 | 120 |
| initiator | 25B | 1 | 1 | 1 | 1 | 1 | 1 |
| solvent | toluene | 100 | 100 | 100 | 100 | 100 | 100 |
| Property | Unit | C1 | C2 | C3 | C4 | C5 | C6 |
| PCT water absorption ratio | % | 0.42 | 0.44 | 0.42 | 0.45 | 0.43 | 0.49 |
| dielectric constant | none | 3.37 | 3.38 | 3.33 | 3.35 | 3.34 | 3.37 |
| dissipation factor | none | 0.00352 | 0.00356 | 0.00347 | 0.00349 | 0.00344 | 0.00348 |
| elongation | % | 5.32 | 6.35 | 6.07 | 6.44 | 6.11 | 6.35 |
| copper foil peeling strength | lb/in | 2.68 | 2.66 | 2.76 | 2.77 | 2.71 | 2.75 |
| glass transition temperature | ° C. | 170 | 166 | 168 | 169 | 171 | 168 |

TABLE 5

| Resin compositions of Examples (in part by weight) and test results | | | | | | |
|---|---|---|---|---|---|---|
| Component | Name | E18 | E19 | E20 | E21 | E22 |
| vinyl group-containing resin | PPO A | | | 80 | 70 | |
| | OPE-2st 2200 | 100 | 50 | | | |
| | SA9000 | | 50 | | | 70 |
| | BMI-70 | | | 10 | | |
| | MIR-5000 | | | 10 | | |
| | Formula (2) | | | | 30 | |
| | TAIC | | | | | 30 |
| | Ricon100 | | | | | |
| | B-1000 | | | | | |
| | Ricon184MA6 | | | | | |
| | H1052 | | | | | |

TABLE 5-continued

| Resin compositions of Examples (in part by weight) and test results | | | | | | |
|---|---|---|---|---|---|---|
| prepolymer | 1 | 70 | 70 | 70 | 70 | 70 |
| | 2 | | | | | |
| | 3 | | | | | |
| | 4 | | | | | |
| | 5 | | | | | |
| | 6 | | | | | |
| | 7 | | | | | |
| | 8 | | | | | |
| | 9 | | | | | |
| | 10 | | | | | |
| | 11 | | | | | |
| | 12 | | | | | |
| | 13 | | | | | |
| monomer | phosphorus-containing compound (1-1) | | | | | |
| | phosphorus-containing compound (1-2) | | | | | |
| | phosphorus-containing compound (1-3) | | | | | |
| | phosphorus-containing compound (1-4) | | | | | |
| | phosphorus-containing compound (1-5) | | | | | |
| | OPE-2st 1200 | | | | | |
| additive | (A) | | | | | |
| | (B) | | | | | |
| | (C) | | | | | |
| | (D) | | | | | |
| filler | SC2050 | 120 | 120 | 120 | 120 | 120 |
| initiator | 25B | 1 | 1 | 1 | 1 | 1 |
| solvent | toluene | 100 | 100 | 100 | 100 | 100 |
| **Property** | **Unit** | **E18** | **E19** | **E20** | **E21** | **E22** |
| PCT water absorption ratio | % | 0.26 | 0.27 | 0.28 | 0.22 | 0.25 |
| dielectric constant | none | 3.11 | 3.09 | 3.09 | 3.12 | 3.08 |
| dissipation factor | none | 0.00282 | 0.00267 | 0.00260 | 0.00285 | 0.00271 |
| copper foil peeling strength | lb/in | 3.22 | 3.17 | 3.19 | 3.15 | 3.21 |
| glass transition temperature | ° C. | 194 | 192 | 192 | 192 | 198 |

TABLE 6

| Resin compositions of Examples (in part by weight) and test results | | | | | | |
|---|---|---|---|---|---|---|
| Component | Name | E23 | E24 | E25 | E26 | E27 |
| vinyl group-containing resin | PPO A | | 50 | | | |
| | OPE-2st 2200 | 35 | | 100 | 100 | 100 |
| | SA9000 | 30 | | | | |
| | BMI-70 | | 10 | | | |
| | MIR-5000 | | | | | |
| | Formula (2) | | | | | |
| | TAIC | 20 | 30 | | | |
| | Ricon100 | 13 | | | | |
| | B-1000 | | 7 | | | |
| | Ricon184MA6 | 2 | 1 | | | |
| | H1052 | | 2 | | | |
| prepolymer | 1 | 70 | 70 | 50 | 90 | |
| | 2 | | | | | 70 |
| | 3 | | | | | |
| | 4 | | | | | |
| | 5 | | | | | |
| | 6 | | | | | |
| | 7 | | | | | |
| | 8 | | | | | |
| | 9 | | | | | |
| | 10 | | | | | |
| | 11 | | | | | |
| | 12 | | | | | |
| | 13 | | | | | |

TABLE 6-continued

| Resin compositions of Examples (in part by weight) and test results | | | | | | |
|---|---|---|---|---|---|---|
| monomer | phosphorus-containing compound (1-1) | | | | | |
| | phosphorus-containing compound (1-2) | | | | | |
| | phosphorus-containing compound (1-3) | | | | | |
| | phosphorus-containing compound (1-4) | | | | | |
| | phosphorus-containing compound (1-5) | | | | | |
| | OPE-2st 1200 | | | | | |
| additive | (A) | | | | | |
| | (B) | | | | | |
| | (C) | | | | | |
| | (D) | | | | | |
| filler | SC2050 | 120 | 120 | 120 | 120 | 120 |
| initiator | 25B | 1 | 1 | 1 | 1 | 1 |
| solvent | toluene | 100 | 100 | 100 | 100 | 100 |
| Property | Unit | E23 | E24 | E25 | E26 | E27 |
| PCT water absorption ratio | % | 0.23 | 0.22 | 0.26 | 0.26 | 0.22 |
| dielectric constant | none | 3.12 | 3.08 | 3.06 | 3.12 | 3.04 |
| dissipation factor | none | 0.00258 | 0.00271 | 0.00283 | 0.00284 | 0.00225 |
| copper foil peeling strength | lb/in | 3.24 | 3.27 | 3.29 | 3.32 | 3.21 |
| glass transition temperature | ° C. | 199 | 212 | 194 | 195 | 200 |

TABLE 7

| Resin compositions of Examples (in part by weight) and test results | | | | | | |
|---|---|---|---|---|---|---|
| Component | Name | E28 | E29 | E30 | E31 | E32 |
| vinyl group-containing resin | PPO A | | | | | |
| | OPE-2st 2200 | 100 | 100 | 100 | 100 | 100 |
| | SA9000 | | | | | |
| | BMI-70 | | | | | |
| | MIR-5000 | | | | | |
| | Formula (2) | | | | | |
| | TAIC | | | | | |
| | Ricon100 | | | | | |
| | B-1000 | | | | | |
| | Ricon184MA6 | | | | | |
| | H1052 | | | | | |
| prepolymer | 1 | | | | | |
| | 2 | | | | | |
| | 3 | 70 | | | | |
| | 4 | | 70 | | | |
| | 5 | | | 70 | | |
| | 6 | | | | 70 | |
| | 7 | | | | | 70 |
| | 8 | | | | | |
| | 9 | | | | | |
| | 10 | | | | | |
| | 11 | | | | | |
| | 12 | | | | | |
| | 13 | | | | | |
| monomer | phosphorus-containing compound (1-1) | | | | | |
| | phosphorus-containing compound (1-2) | | | | | |
| | phosphorus-containing compound (1-3) | | | | | |
| | phosphorus-containing compound (1-4) | | | | | |
| | phosphorus-containing compound (1-5) | | | | | |
| | OPE-2st 1200 | | | | | |
| additive | (A) | | | | | |
| | (B) | | | | | |
| | (C) | | | | | |
| | (D) | | | | | |

TABLE 7-continued

| Resin compositions of Examples (in part by weight) and test results | | | | | | |
|---|---|---|---|---|---|---|
| filler | SC2050 | 120 | 120 | 120 | 120 | 120 |
| initiator | 25B | 1 | 1 | 1 | 1 | 1 |
| solvent | toluene | 100 | 100 | 100 | 100 | 100 |
| Property | Unit | E28 | E29 | E30 | E31 | E32 |
| PCT water absorption ratio | % | 0.21 | 0.25 | 0.23 | 0.28 | 0.27 |
| dielectric constant | none | 3.14 | 3.09 | 3.07 | 3.03 | 3.02 |
| dissipation factor | none | 0.00287 | 0.00242 | 0.00251 | 0.00259 | 0.00261 |
| copper foil peeling strength | lb/in | 3.24 | 3.16 | 3.31 | 3.41 | 3.45 |
| glass transition temperature | ° C. | 197 | 191 | 193 | 192 | 207 |

TABLE 8

Resin compositions of Examples (in part by weight) and test results

| Component | Name | E33 | E34 | E35 | E36 | E37 | E38 |
|---|---|---|---|---|---|---|---|
| vinyl group-containing resin | PPO A | | | | 15 | 15 | |
| | OPE-2st 2200 | 100 | 100 | 100 | 20 | 20 | 100 |
| | SA9000 | | | | 10 | 15 | |
| | BMI-70 | | | | 15 | 10 | |
| | MIR-5000 | | | | 10 | 17 | |
| | Formula (2) | | | | 12 | 5 | |
| | TAIC | | | | 5 | 5 | |
| | Ricon100 | | | | 5 | 5 | |
| | B-1000 | | | | 5 | 5 | |
| | Ricon184MA6 | | | | 1.5 | 1.5 | |
| | H1052 | | | | 1.5 | 1.5 | |
| prepolymer | 1 | | 50 | 50 | 5 | 5 | 60 |
| | 2 | | | | 5 | 5 | |
| | 3 | | | | 5 | 5 | |
| | 4 | | | | 20 | 10 | |
| | 5 | | | | 10 | 20 | |
| | 6 | | | | 15 | 5 | |
| | 7 | | | | 5 | 10 | |
| | 8 | 70 | | | 5 | 10 | |
| | 9 | | | | | | |
| | 10 | | | | | | |
| | 11 | | | | | | |
| | 12 | | | | | | |
| | 13 | | | | | | |
| monomer | phosphorus-containing compound (1-1) | | | | | | |
| | phosphorus-containing compound (1-2) | | | | | | |
| | phosphorus-containing compound (1-3) | | | | | | |
| | phosphorus-containing compound (1-4) | | | | | | |
| | phosphorus-containing compound (1-5) | | | | | | |
| | OPE-2st 1200 | | | | | | |
| additive | (A) | | 25 | | 15 | 5 | |
| | (B) | | | 25 | 5 | 10 | |
| | (C) | | | | 10 | 20 | |
| | (D) | | | | 15 | 10 | |
| filler | SC2050 | 120 | 120 | 120 | 80 | 150 | 120 |
| initiator | 25B | 1 | 1 | 1 | 2 | 0.5 | 1 |
| solvent | toluene | 100 | 100 | 100 | 80 | 120 | 100 |

TABLE 8-continued

| Resin compositions of Examples (in part by weight) and test results | | | | | | | |
|---|---|---|---|---|---|---|---|
| Property | Unit | E33 | E34 | E35 | E36 | E37 | E38 |
| PCT water absorption ratio | % | 0.22 | 0.28 | 0.27 | 0.24 | 0.22 | 0.26 |
| dielectric constant | none | 3.27 | 3.22 | 3.21 | 3.03 | 3.02 | 3.08 |
| dissipation factor | none | 0.00252 | 0.00232 | 0.00233 | 0.00236 | 0.00237 | 0.00284 |
| copper foil peeling strength | lb/in | 3.38 | 3.37 | 3.37 | 3.37 | 3.45 | 3.29 |
| glass transition temperature | ° C. | 200 | 211 | 212 | 226 | 228 | 195 |

TABLE 9

| Resin compositions of Comparative Examples (in part by weight) and test results | | | | |
|---|---|---|---|---|
| Component | Name | C7 | C8 | C9 |
| vinyl group-containing resin | PPO A | | | |
| | OPE-2st 2200 | 100 | 100 | 100 |
| | SA9000 | | | |
| | BMI-70 | | | |
| | MIR-5000 | | | |
| | Formula (2) | | | |
| | TAIC | | | |
| | Ricon100 | | | |
| | B-1000 | | | |
| | Ricon184MA6 | | | |
| | H1052 | | | |
| prepolymer | 1 | | | 40 |
| | 2 | | | |
| | 3 | | | |
| | 4 | | | |
| | 5 | | | |
| | 6 | | | |
| | 7 | | | |
| | 8 | | | |
| | 9 | 70 | | |
| | 10 | | 70 | |
| | 11 | | | |
| | 12 | | | |
| | 13 | | | |
| monomer | phosphorus-containing compound (1-1) | | | |
| | phosphorus-containing compound (1-2) | | | |
| | phosphorus-containing compound (1-3) | | | |
| | phosphorus-containing compound (1-4) | | | |
| | phosphorus-containing compound (1-5) | | | |
| | OPE-2st 1200 | | | |
| additive | (A) | | | |
| | (B) | | | |
| | (C) | | | |
| | (D) | | | |
| filler | SC2050 | 120 | 120 | 120 |
| initiator | 25B | 1 | 1 | 1 |
| solvent | toluene | 100 | 100 | 100 |
| Property | Unit | C7 | C8 | C9 |
| PCT water absorption ratio | % | 0.49 | 0.49 | 0.49 |
| dielectric constant | none | 3.45 | 3.48 | 3.51 |
| dissipation factor | none | 0.00338 | 0.00325 | 0.00341 |
| copper foil peeling strength | lb/in | 2.73 | 2.77 | 2.71 |
| glass transition temperature | ° C. | 171 | 172 | 175 |

TABLE 10

| Resin compositions of Comparative Examples (in part by weight) and test results | | | | | |
|---|---|---|---|---|---|
| Component | Name | C10 | C11 | C12 | C13 |
| vinyl group-containing resin | PPO A | | | | |
| | OPE-2st 2200 | 100 | 100 | 100 | 100 |
| | SA9000 | | | | |
| | BMI-70 | | | | |
| | MIR-5000 | | | | |
| | Formula (2) | | | | |
| | TAIC | | | | |
| | Ricon100 | | | | |
| | B-1000 | | | | |
| | Ricon184MA6 | | | | |
| | H1052 | | | | |
| prepolymer | 1 | 95 | | | |
| | 2 | | | | |
| | 3 | | | | |
| | 4 | | | | |
| | 5 | | | | |
| | 6 | | | | |

TABLE 10-continued

| Resin compositions of Comparative Examples (in part by weight) and test results | | | | | |
|---|---|---|---|---|---|
| | 7 | | | | |
| | 8 | | | | |
| | 9 | | | | |
| | 10 | | | | |
| | 11 | | 70 | | |
| | 12 | | | 70 | |
| | 13 | | | | 70 |
| monomer | phosphorus-containing compound (1-1) | | | | |
| | phosphorus-containing compound (1-2) | | | | |
| | phosphorus-containing compound (1-3) | | | | |
| | phosphorus-containing compound (1-4) | | | | |
| | phosphorus-containing compound (1-5) | | | | |
| | OPE-2st 1200 | | | | |
| additive | (A) | | | | |
| | (B) | | | | |
| | (C) | | | | |
| | (D) | | | | |
| filler | SC2050 | 120 | 120 | 120 | 120 |
| initiator | 25B | 1 | 1 | 1 | 1 |
| solvent | toluene | 100 | 100 | 100 | 100 |
| **Property** | **Unit** | **C10** | **C11** | **C12** | **C13** |
| PCT water absorption ratio | % | 0.49 | 0.45 | 0.48 | 0.44 |
| dielectric constant | none | 3.49 | 3.48 | 3.46 | 3.43 |
| dissipation factor | none | 0.00324 | 0.00344 | 0.00342 | 0.00338 |
| copper foil peeling strength | lb/in | 2.72 | 2.75 | 2.74 | 2.71 |
| glass transition temperature | ° C. | 166 | 168 | 177 | 171 |

Samples (specimens) for the properties measured above were prepared as described below and tested and analyzed under specified conditions below.

1. Resin Film:

Resin composition from each Example or each Comparative Example, in part by weight, was individually added to a stirred tank and well-mixed to form a varnish, which was coated on a copper foil (product name MT18Ex, containing 18 μm carrier copper foil and 3 μm thin copper foil, available from Mitsui Kinzoku) to uniformly adhere the resin composition thereon, followed by heating and baking at 100° C. for 10 minutes. After removing the 18 μm carrier copper foil, the 3 μm thin copper was removed by etching to obtain a resin film with a thickness of 32.5p m.

2. Prepreg (PP):

Resin composition (in part by weight) from each Example or each Comparative Example was separately added to a stirred tank and well-mixed to form a varnish. Then the varnish was loaded to an impregnation tank, and a fiberglass fabric (e.g., 1078 L-glass fiber fabric, available from Shin-Etsu) was impregnated into the impregnation tank to adhere the resin composition onto the fiberglass fabric, followed by heating at 100° C. to 120° C. to the semi-cured state (B-stage) to obtain a prepreg, having a resin content of about 70%.

3. Copper-Containing Laminate 1 (Obtained by Laminating Two Prepregs):

Two 0.5 oz hyper very low profile (HVLP) copper foils and two prepregs obtained from 1078 L-glass fiber fabrics impregnated with each sample were prepared, each prepreg having a resin content of about 70%. A copper foil, two prepregs and a copper foil were superimposed in such order and then subjected to a vacuum condition for lamination at 250 psi to 600 psi and 200° C. to 220° C. for 90 minutes to 120 minutes to form each copper-containing laminate 1. The two prepregs were cured to form an insulation layer between the two copper foils, and the insulation layer has a resin content of about 70%.

4. Copper-Containing Laminate 2 (Obtained by Laminating Six Prepregs):

The preparation method was substantially the same as copper-containing laminate 1, except that the insulating layer was formed by curing six prepregs.

5. Copper-Free Laminate 1 (Obtained by Laminating Two Prepregs):

Each copper-containing laminate 1 made by laminating two prepregs obtained above was etched to remove the copper foils on both sides so as to obtain the copper-free laminate 1 (obtained by laminating two prepregs).

6. Copper-Free Laminate 2 (Obtained by Laminating Six Prepregs):

Each copper-containing laminate 2 made by laminating six prepregs obtained above was etched to remove the copper foils on both sides so as to obtain the copper-free laminate 2 (obtained by laminating six prepregs).

For each sample, test items and test methods are described below.

PCT (Pressure Cooking Test) Water Absorption Ratio

A 2 inch×2 inch copper-free laminate 2 sample (obtained by laminating six prepregs, resin content of about 70%) was placed in a 105±10° C. oven and baked for 1 hour, then cooled at room temperature of about 25° C. for 10 minutes and weighed to give a weight value W1 representing the weight of the copper-free laminate; then the sample was subjected to a pressure cooking test (PCT) by reference to IPC-TM-650 2.6.16.1 for 5 hours of moisture absorption (test temperature of 121° C. and relative humidity of 100%) and wiped to remove residual water on the surface; the sample was weighed again to give a weight value W2 representing the weight of the copper-free laminate after water absorption. The PCT water absorption ratio (%) was calculated as follow: water absorption ratio (%)=[(W2−W1)/W1]×100%. In the present technical field, lower PCT water absorption ratio is better, and a difference in PCT water absorption ratio of greater than or equal to 0.1% represents a substantial difference (i.e., significant technical difficulty) in PCT water absorption ratio in different laminates.

Dielectric Constant (Dk)

The aforesaid copper-free laminate 1 (obtained by laminating two prepregs, resin content of about 70%) was subject to dielectric constant measurement. Each sample was measured by using a microwave dielectrometer (available from AET Corp.) by reference to JIS C2565 at room temperature (about 25° C.) and under 10 GHz frequency. Under a 10 GHz frequency, for a low Dk material, a difference in Dk of less than 0.1 represents no substantial difference (i.e., no significant technical difficulty) in dielectric constant in different laminates, and a difference in Dk of greater than or equal to 0.1 represents a substantial difference (i.e., significant technical difficulty) in dielectric constant in different laminates.

Dissipation Factor (Df)

The aforesaid copper-free laminate 1 (obtained by laminating two prepregs, having a resin content of about 70%) was subject to dissipation factor measurement. Each sample was measured by using a microwave dielectrometer (available from AET Corp.) by reference to JIS $C_{2565}$ at room temperature (about 25° C.) and under 10 GHz frequency to obtain the dissipation factor. Lower dissipation factor represents better dielectric properties of the sample. Under a 10 GHz frequency, for a Df value of between 0.0010 and 0.0030, a difference in Df of less than 0.0005 represents no substantial difference (i.e., no significant technical difficulty) in dissipation factor in different laminates, and a difference in Df of greater than or equal to 0.0005 represents a substantial difference (i.e., significant technical difficulty) in dissipation factor in different laminates.

Elongation

The resin film sample was subjected to the measurement. The sample was tested by using a tensile strength tester, by reference to ASTM D412 at a tensile rate of 50.8 mm/min, to measure the elongation (%) when the sample broke; higher elongation is better. In the present technical field, a difference in elongation of greater than or equal to 0.5% represents a substantial difference in elongation in different samples.

Copper Foil Peeling Strength (0.5 Ounce, Hoz Peeling Strength, Hoz P/S)

The aforesaid copper-containing laminate 2 (obtained by laminating six prepregs, resin content of about 70%) was cut into a rectangular sample with a width of 24 mm and a length of greater than 60 mm, which was etched to remove surface copper foil to leave a rectangular copper foil with a width of 3.18 mm and a length of greater than 60 mm, and tested by using a tensile strength tester by reference to IPC-TM-650 2.4.8 at room temperature (about 25° C.) to measure the force (lb/in) required to separate the 0.5 ounce copper foil from the insulation layer of the laminate. In the technical field to which the present disclosure pertains, higher copper foil peeling strength is better. Under a 10 GHz frequency, for a copper-clad laminate with a Df value of between 0.0010 and 0.0030, a difference in copper foil peeling strength of greater than or equal to 0.3 lb/in represents a substantial difference in copper foil peeling strength of different laminates.

Glass Transition Temperature (Tg)

The copper-free laminate 2 (obtained by laminating six prepregs, resin content of about 70%) sample was subjected to the measurement. A dynamic mechanical analyzer (DMA) was used by reference to IPC-TM-650 2.4.24.4 "Glass Transition and Modulus of Materials Used in High Density Interconnection (HDI) and Microvias-DMA Method" to measure the glass transition temperature (° C.) of each sample. Temperature interval during the measurement was set at 50-400° C. with a temperature increase rate of 2° C./minute; higher glass transition temperature is more preferred.

The following observations can be made from Table ito Table 11.

In the resin composition, such as Comparative Examples $C_1$-$C_4$, if other phosphorus-containing compounds different from the phosphorus-containing compound of Formula (1) were used, the article will fail to achieve desirable improvements in at least one of the properties including PCT water absorption ratio, dielectric constant, dissipation factor, elongation, copper foil peeling strength and glass transition temperature.

In the resin composition, such as Comparative Examples $C_5$-$C_6$, if the amount of the phosphorus-containing compound of Formula (1) is not within 35 to 60 parts by weight (relative to 100 parts by weight of the vinyl group-containing resin), the article will fail to achieve desirable improvements in at least one of the properties including PCT water absorption ratio, dielectric constant, dissipation factor, elongation, copper foil peeling strength and glass transition temperature.

The resin compositions of Examples E14-E17 contain a phosphorus-containing maleimide resin, and the articles have better properties including PCT water absorption ratio, dielectric constant, dissipation factor, elongation, copper foil peeling strength and glass transition temperature.

In the resin composition, such as Comparative Examples C7, C8 and C11-C13, if other prepolymers different from the prepolymer of the phosphorus-containing compound of Formula (1) were used, the article will fail to achieve desirable improvements in at least one of the properties including PCT water absorption ratio, dielectric constant, dissipation factor, copper foil peeling strength and glass transition temperature.

In the resin composition, such as Comparative Examples C9-C10, if the amount of the prepolymer of the phosphorus-containing compound of Formula (1) is not within 50 to 90 parts by weight (relative to 100 parts by weight of the vinyl group-containing resin), the article will fail to achieve desirable improvements in at least one of the properties including PCT water absorption ratio, dielectric constant, dissipation factor, copper foil peeling strength and glass transition temperature.

The resin compositions of Examples E34-E37 contain a phosphorus-containing maleimide resin, and the article have better properties including PCT water absorption ratio, dielectric constant, dissipation factor, copper foil peeling strength and glass transition temperature.

Compared with Comparative Examples C1-C13, articles made from Examples E1-E38 can achieve improvements in at least one of the following properties including PCT water absorption ratio, dielectric constant, dissipation factor, elongation, copper foil peeling strength and glass transition temperature. In addition, the overall observation of Examples E1-E17 (including the vinyl group-containing resin and the phosphorus-containing compound of Formula (1)) and Examples E18 to E38 (including the vinyl group-containing resin and the prepolymer of the phosphorus-containing compound of Formula (1)) indicates that if the prepolymer of the phosphorus-containing compound of Formula (1) is used in the resin composition, compared with the technical solution of using the phosphorus-containing compound of Formula (1), further improvements in one or more properties may be achieved, such as but not limited to PCT water absorption, copper foil peeling strength and/or glass transition temperature. For example, a side-by-side comparison of Example E38 and Example E9 indicates that using the technical solution of the prepolymer of the phosphorus-containing compound of Formula (1) can further achieve improvements in the property of glass transition temperature.

The above detailed description is merely illustrative in nature and is not intended to limit the embodiments of the subject matter or the application and use of such embodiments. As used herein, the term "exemplary" means "serving as an example, instance, or illustration." Any implementation described herein as exemplary is not necessarily to be construed as preferred or advantageous over other implementations.

Moreover, while at least one exemplary example or comparative example has been presented in the foregoing detailed description, it should be appreciated that a vast number of variations exist. It should also be appreciated that the exemplary one or more embodiments described herein are not intended to limit the scope, applicability, or configuration of the claimed subject matter in any way. Rather, the foregoing detailed description will provide those skilled in the art with a convenient guide for implementing the described one or more embodiments. Also, various changes can be made in the function and arrangement of elements without departing from the scope defined by the claims, which include known equivalents and foreseeable equivalents at the time of filing this patent application.

What is claimed is:

1. A resin composition, comprising:

a vinyl group-containing resin; and a phosphorus-containing compound of Formula (1) or a prepolymer thereof;

wherein:

relative to 100 parts by weight of the vinyl group-containing resin, the phosphorus-containing compound of Formula (1) is 35 to 60 parts by weight; or relative to 100 parts by weight of the vinyl group-containing resin, the prepolymer of the phosphorus-containing compound of Formula (1) is 50 to 90 parts by weight;

Formula (1)

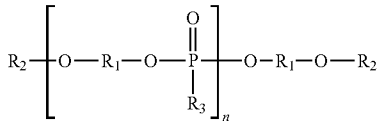

wherein $R_1$ each independently represent any divalent functional group of Formula (a) to Formula (d):

Formula (a)

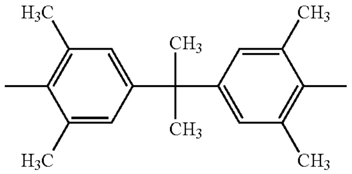

Formula (b)

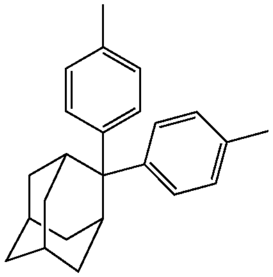

Formula (c)

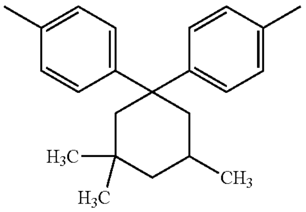

Formula (d)

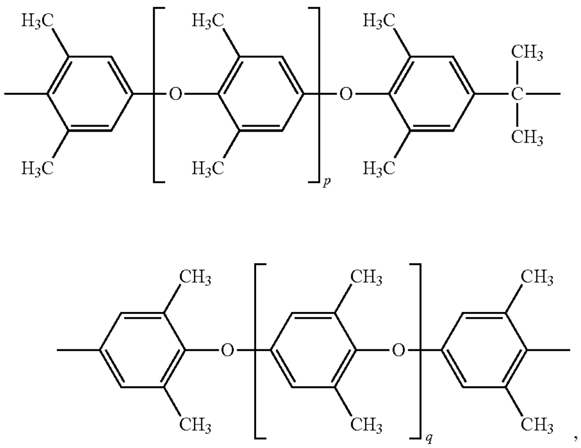

, wherein p and q are each independently a positive integer, and p+q is between 2 and 11;

$R_2$ each independently represent any monovalent functional group of Formula (e) to Formula (f):

Formula (e)

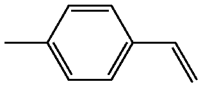

Formula (f)

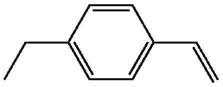

$R_3$ represents a phenyl group; and n represents a repeating number of unit in the brackets by which the phosphorus-containing compound of Formula (1) has a weight average molecular weight of between 500 and 10,000.

2. The resin composition of claim 1, wherein the vinyl group-containing resin comprises a vinyl group-containing polyphenylene ether resin, a maleimide resin, a compound of Formula (2), a vinyl group-containing polyolefin resin, triallyl isocyanurate or a combination thereof, Formula (2)

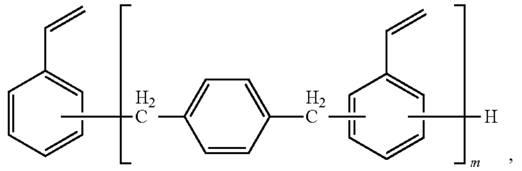

wherein m is an integer of 1 to 20.

3. The resin composition of claim 1, wherein the prepolymer of the phosphorus-containing compound of Formula (1) is prepared from a mixture subjected to a prepolymerization reaction, and the mixture comprises the phosphorus-containing compound of Formula (1) and a vinyl group-containing polyphenylene ether resin in a molar ratio of between 1:2 and 2:1.

4. The resin composition of claim 3, wherein the mixture is subjected to the prepolymerization reaction at 60° C. to 95° C. for 4 to 6 hours to prepare the prepolymer of the phosphorus-containing compound of Formula (1).

5. The resin composition of claim 3, wherein the prepolymerization reaction has a conversion rate of between 10% and 90%.

6. The resin composition of claim 1, comprising 100 parts by weight of the vinyl group-containing resin and 35 to 60 parts by weight of the phosphorus-containing compound of Formula (1).

7. The resin composition of claim 1, comprising 100 parts by weight of the vinyl group-containing resin and 50 to 90 parts by weight of the prepolymer of the phosphorus-containing compound of Formula (1).

8. The resin composition of claim 1, further comprising a phosphorus-containing maleimide resin.

9. The resin composition of claim 8, comprising 100 parts by weight of the vinyl group-containing resin, 35 to 60 parts by weight of the phosphorus-containing compound of Formula (1) and 5 to 60 parts by weight of the phosphorus-containing maleimide resin.

10. The resin composition of claim 8, comprising 100 parts by weight of the vinyl group-containing resin, 50 to 90 parts by weight of the prepolymer of the phosphorus-containing compound of Formula (1) and 5 to 45 parts by weight of the phosphorus-containing maleimide resin.

11. The resin composition of claim 1, further comprising inorganic filler, curing accelerator, polymerization inhibitor, solvent, silane coupling agent, surfactant, coloring agent, toughening agent or a combination thereof.

12. An article made from the resin composition of claim 1, comprising a prepreg, a resin film, a laminate or a printed circuit board.

13. The article of claim 12, having a water absorption ratio as measured by reference to IPC-TM-650 2.6.16.1 of less than or equal to 0.31%.

14. The article of claim 12, having an elongation as measured by reference to ASTM D412 of greater than or equal to 6.95%.

15. The article of claim 12, having a copper foil peeling strength as measured by reference to IPC-TM-650 2.4.8 of greater than or equal to 3.07 lb/in.

* * * * *